United States Patent
Kakadjian et al.

(10) Patent No.: US 11,390,797 B2
(45) Date of Patent: Jul. 19, 2022

(54) COMPOSITIONS TO IMPROVE, OPTIMIZE, OR MAXIMIZE PROPPANT SUSPENSION AND METHODS OF MAKING AND USING SAME

(71) Applicant: NexTier Completion Solutions Inc., Houston, TX (US)

(72) Inventors: Sarkis Kakadjian, The Woodlands, TX (US); John Vu, The Woodlands, TX (US); Vidya Sagar Bammidi, The Woodlands, TX (US)

(73) Assignee: NexTier Completion Solutions Inc., Houston, TX (US)

( * ) Notice: Subject to any disclaimer, the term of this patent is extended or adjusted under 35 U.S.C. 154(b) by 53 days.

(21) Appl. No.: 16/857,534

(22) Filed: Apr. 24, 2020

(65) Prior Publication Data
US 2020/0354627 A1    Nov. 12, 2020

Related U.S. Application Data

(60) Provisional application No. 62/841,877, filed on May 2, 2019.

(51) Int. Cl.
*C09K 8/68* (2006.01)
*E21B 43/267* (2006.01)
*C09K 8/80* (2006.01)

(52) U.S. Cl.
CPC .............. *C09K 8/685* (2013.01); *C09K 8/805* (2013.01); *E21B 43/267* (2013.01); *C09K 2208/28* (2013.01)

(58) Field of Classification Search
CPC .......... C09K 8/805; C09K 8/685; C09K 8/62; C09K 8/68; C09K 8/80; E21B 43/267; E21B 43/26
See application file for complete search history.

(56) References Cited

U.S. PATENT DOCUMENTS

| | | |
|---|---|---|
| 4,457,372 A | 7/1984 | Doster et al. |
| 5,197,544 A | 3/1993 | Hines |
| 6,232,274 B1 | 5/2001 | Huges et al. |
| 8,157,010 B2 | 4/2012 | Murphy et al. |
| 9,068,068 B2 | 6/2015 | Lee et al. |
| 9,200,192 B2 | 12/2015 | Zelenev et al. |
| 9,222,013 B1 | 12/2015 | Champagne et al. |
| 9,701,888 B2 | 7/2017 | Nguyen |
| 9,884,988 B2 | 2/2018 | Dismuke et al. |
| 2005/0006093 A1* | 1/2005 | Nguyen ............... C09K 8/706 166/281 |
| 2015/0252249 A1 | 9/2015 | Hill et al. |
| 2017/0183560 A1 | 6/2017 | McDaniel et al. |

FOREIGN PATENT DOCUMENTS

| | | | | |
|---|---|---|---|---|
| CA | 3039468 A1 | * | 4/2018 | ............. C09K 8/805 |
| CN | 107429561 A | * | 12/2017 | ............. C09K 8/035 |
| WO | 2016-018350 A1 | | 2/2016 | |

* cited by examiner

*Primary Examiner* — Zakiya W Bates
(74) *Attorney, Agent, or Firm* — Robert W. Strozier (57) ABSTRACT

Compositions and methods of fracturing including a hydrophobic rendered proppant or a proppant slurry and a fracturing fluid including an aqueous base fluid, a viscosifying agent or mixture of viscosifying agents, and an enhancing proppant suspending composition including an aldehyde, a mixture of aldehydes, a ketone, a mixture of ketones, or mixtures thereof, and optionally a crosslinking agent or a mixture of crosslinking agents.

15 Claims, 3 Drawing Sheets

COMPOSITIONS TO IMPROVE, OPTIMIZE, OR MAXIMIZE PROPPANT SUSPENSION AND METHODS OF MAKING AND USING SAME

RELATED APPLICATIONS

This application claims priority to and the benefit of U.S. Provisional Patent Application Ser. No. 62/896,877 filed May 2, 2019 (2 May 2019).

BACKGROUND OF THE INVENTION

1. Field of the Invention

Embodiments of the present disclosure relate to compositions for improving, optimizing, or maximizing proppant suspension in fracturing fluids including treated extremely hydrophobic proppant and methods for making and using same.

More particularly, embodiments of the present disclosure relate to compositions for improving, optimizing, or maximizing proppant suspension in fracturing fluids including hydrophobic proppant and methods for making and using same, wherein the composition includes a fracturing fluid including an aqueous base fluid, a friction reducer or a mixture of friction reducers, a high viscosity friction reducer or mixtures of high viscosity friction reducer such as polyacrylamides and derivatives thereof and/or a viscosifying agent or mixture of viscosifying agents such as polysaccharides, a suspending composition including an aldehyde, a mixture of aldehydes, a ketone, a mixture of ketones, or mixtures thereof, a hydrophobically modified proppant or a hydrophobically modified proppant slurry, optionally a hydrophobic proppant coating composition, optionally a crosslinking agent or a mixture of crosslinking agents, and optionally a crosslinking delay agent or a mixture of crosslinking delay agents.

2. Description of the Related Art

Recently the use of systems and methods for suspending hydrophobically modified proppant with the current technology during hydraulic fracturing operations has been applied mainly in using fresh, brackish and produced water with mixed results on hydrophobically modified proppant suspension, buoyancy and/or fluffiness.

Historically, hydrophobically modified proppants have been disclosed by U.S. Pat. Nos. 7,723,274; 9,714,371; 9,976,075; and 10,023,786. In these patents, proppant modification was accomplished using a plurality of silicon containing compounds such as organosiloxane, organosilane, fluoro-organosiloxane and fluoro-organosilane compounds. In all cases, the compounds changed the wettability of the proppant making the proppant "extremely hydrophobic", wherein extremely means that the contact angle of water on the treated solid substrate is greater than about 90°.

While many systems and methods have been purposed and used for hydrophobically modified proppant suspension, there is still a need in the art for other new and novel compositions and methods for hydrophobically modified proppant suspension in fracturing fluid using brackish waters, produced water, or other waters having medium or high total dissolved solids and/or medium to high concentrations of hard water components.

SUMMARY OF THE DISCLOSURE

Proppant Suspending Compositions

Embodiments of this disclosure provide hydrophobically modified proppant suspending compositions including an aldehyde, a mixture of aldehydes, a ketone, a mixture of ketones, or mixtures or combinations thereof present in an effective amount between about 1 ppm and about 1,000 ppm. In certain embodiments, the hydrophobically modified proppant suspending compositions do not include a quaternary salt of the general formula $R^1R^2R^3ArN^+X^-$, wherein $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and about 40 carbon atoms, wherein one or more of the carbon atoms may be replace by an oxygen atom, Ar is an aryl group, alkaaryl groups, aralkyl groups, and mixtures thereof having between about 5 and about 40 carbon atoms, wherein one or more of the carbon atoms may be replaced with an oxygen atom, a nitrogen atom, a sulfur atoms, or mixtures thereof, and $X^-$ is a counterion.

Fracturing Fluid Compositions

Embodiments of this disclosure provide fracturing fluid compositions including an aqueous base fluid, a friction reducer or a mixture of friction reducers, a high viscosity friction reducer or mixtures of high viscosity friction reducer such as polyacrylamides and derivatives thereof, a viscosifying agent or mixture of viscosifying agents such as polysaccharides present in an amount between about 0.01% v/v to about 1.00% v/v, an effective amount of a hydrophobically modified proppant suspending composition including an aldehyde, a mixture of aldehydes, a ketone, a mixture of ketones, or mixtures or combinations thereof, optionally a crosslinking agent or a mixture of crosslinking agents, and optionally a crosslinking delay agent or a mixture of crosslinking delay agents, wherein the effective amount between about 1 ppm and about 1,000 ppm. In certain embodiments, the fracturing fluid compositions include hydrophobically modified proppant in a fracturing fluid carrier including brackish waters, produced waters, or other waters having medium or high total dissolved solids and/or medium to high concentrations of hard water components.

Embodiments of this disclosure provide fracturing fluid compositions including an aqueous base fluid, a friction reducer or a mixture of friction reducers, a high viscosity friction reducer or mixtures of high viscosity friction reducer such as polyacrylamides and derivatives thereof and/or a viscosifying agent or mixture of viscosifying agents such as polysaccharides present in an amount between about 0.01% v/v to about 1.00% v/v, an effective amount of a hydrophobically modified proppant suspending composition including an aldehyde, a mixture of aldehydes, a ketone, a mixture of ketones, or mixtures or combinations thereof, a hydrophobically modified proppant, optionally a crosslinking agent or a mixture of crosslinking agents, and optionally a crosslinking delay agent or a mixture of crosslinking delay agents, wherein the effective amount is between about 1 ppm and about 1,000 ppm. In certain embodiments, the fracturing fluid compositions also include hydrophobic proppant modifying composition. In other embodiments, the aqueous base fluids include brackish waters, produced waters, or other waters having medium or high total dissolved solids and/or medium to high concentrations of hard water components.

Methods for Making Proppant Suspending Compositions

Embodiments of this disclosure provide methods of making hydrophobically modified proppant suspending compositions including blending an aqueous base fluid, a friction reducer or a mixture of friction reducers, a high viscosity friction reducer or mixtures of high viscosity friction reducer such as polyacrylamides and derivatives thereof, a viscosifying agent or mixture of viscosifying agents such as polysaccharides present in an amount between about 0.01% v/v to about 1.00% v/v, an effective amount of a hydrophobically modified proppant suspending composition including an aldehyde, a mixture of aldehydes, a ketone, a mixture of ketones, or mixtures or combinations thereof, optionally a crosslinking agent or a mixture of crosslinking agents, and optionally a crosslinking delay agent or a mixture of crosslinking delay agents, wherein the effective in an amount between about 1 ppm and about 1,000 ppm. In certain embodiments, the fracturing fluid compositions include a hydrophobic proppant modifying composition. In other embodiments, the aqueous base fluids include brackish waters, produced waters, or other waters having medium or high total dissolved solids and/or medium to high concentrations of hard water components.

Methods for Making Fracturing Fluid Compositions

Embodiments of this disclosure provide methods of making fracturing fluids including forming a fracturing fluid including blending an aqueous base fluid, a friction reducer or a mixture of friction reducers, a high viscosity friction reducer or mixtures of high viscosity friction reducer such as polyacrylamides and derivatives thereof, a viscosifying agent or mixture of viscosifying agents such as polysaccharides present in an amount between about 0.01% v/v to about 1.00% v/v, an effective amount of a hydrophobically modified proppant suspending composition including an aldehyde, a mixture of aldehydes, a ketone, a mixture of ketones, or mixtures or combinations thereof, a hydrophobically modified proppant, optionally a crosslinking agent or a mixture of crosslinking agents, and optionally a crosslinking delay agent or a mixture of crosslinking delay agents, wherein the effective in an amount between about 1 ppm and about 1,000 ppm.

Embodiments of this disclosure provide methods of making fracturing fluids including forming a first fracturing fluid including blending an aqueous base fluid, a friction reducer or a mixture of friction reducers, a high viscosity friction reducer or mixtures of high viscosity friction reducer such as polyacrylamides and derivatives thereof, a viscosifying agent or mixture of viscosifying agents such as polysaccharides present in an amount between about 0.01% v/v to about 1.00% v/v, optionally a crosslinking agent or a mixture of crosslinking agents, an effective amount of a hydrophobically modified proppant suspending composition including an aldehyde, a mixture of aldehydes, a ketone, a mixture of ketones, or mixtures or combinations thereof and optionally a crosslinking delay agent or a mixture of crosslinking delay agents, wherein the effective in an amount between about 1 ppm and 1,000 ppm. The methods also include forming a carrier solution and a hydrophobically modified proppant, wherein the carrier solution includes a hydrophobic proppant coating composition.

Methods for Fracturing Formations

Embodiments of this disclosure provide methods of fracturing a formation including pumping or injecting a fracturing fluid including blending an aqueous base fluid, a friction reducer or a mixture of friction reducers, a high viscosity friction reducer or mixtures of high viscosity friction reducer such as polyacrylamides and derivatives thereof, a viscosifying agent or mixture of viscosifying agents such as polysaccharides present in an amount between about 0.01% v/v to about 1.00% v/v, an effective amount of a hydrophobically modified proppant suspending composition including an aldehyde, a mixture of aldehydes, a ketone, a mixture of ketones, or mixtures or combinations thereof, a hydrophobically modified proppant, optionally a crosslinking agent or a mixture of crosslinking agents, and optionally a crosslinking delay agent or a mixture of crosslinking delay agents under fracturing conditions, wherein the effective in an amount between about 1 ppm and 1,000 ppm and wherein the fracturing conditions. In certain embodiments, the methods also include spraying a hydrophobic proppant coating composition into the proppant prior adding the proppant to a fracturing fluid carrier including an aqueous base fluid includes brackish waters, produced waters, or other waters having medium or high total dissolved solids and/or medium to high concentrations of hard water components.

BRIEF DESCRIPTION OF THE DRAWINGS OF THE DISCLOSURE

The disclosure can be better understood with reference to the following detailed description together with the appended illustrative drawings in which like elements are numbered the same.

DEFINITIONS OF TERM USED IN THE DISCLOSURE

The following definitions are provided in order to aid those skilled in the art in understanding the detailed description of the present disclosure.

The term "about" means that the value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "substantially" or "essentially" means that the value is within about 5% of the indicated value. In certain embodiments, the value is within about 2.5% of the indicated value. In certain embodiments, the value is within about 1% of the indicated value. In certain embodiments, the value is within about 0.5% of the indicated value. In certain embodiments, the value is within about 0.1% of the indicated value.

The term "fracturing" refers to the process and methods of breaking down a geological formation, i.e. the rock formation around a well bore, by pumping fluid at very high pressures, in order to increase production rates from a hydrocarbon reservoir. The fracturing methods of this disclosure use otherwise conventional techniques known in the art.

The term "proppant" refers to a granular substance suspended in the fracturing fluid during the fracturing operation, which serves to keep the formation from closing back down upon itself once the pressure is released. Proppants envisioned by the present disclosure include, but are not limited to, conventional proppants familiar to those skilled in the art such as sand (e.g., about 20 to about 40 mesh sand, about 30 to about 50 mesh sand, about 100 mesh sand, etc.), resin-coated sand, sintered bauxite, glass beads, and similar materials.

The term "resin coated proppant" means any proppant coated with a resin or polymeric material such as resin coated proppants from CARBO Ceramics Inc., Hexion, Fairmount Santrol, or other resin coated proppants.

The term "hydrophobic proppant" or "hydrophobically modified proppant" means any proppant coated with a polymer to render the proppant hydrophobic such as coating a silicon containing compound.

The term "fracturing layer" is used to designate a layer, or layers, of rock that are intended to be fractured in a single fracturing treatment. It is important to understand that a fracturing layer may include one or more than one of rock layers or strata as typically defined by differences in permeability, rock type, porosity, grain size, Young's modulus, fluid content, or any of many other parameters. That is, a fracturing layer is the rock layer or layers in contact with all the perforations through which fluid is forced into the rock in a given treatment. The operator may choose to fracture, at one time, a fracturing layer that includes water zones and hydrocarbon zones, and/or high permeability and low permeability zones (or even impermeable zones such as shale zones) etc. Thus a fracturing layer may contain multiple regions that are conventionally called individual layers, strata, zones, streaks, pay zones, etc., and we use such terms in their conventional manner to describe parts of a fracturing layer. Typically the fracturing layer contains a hydrocarbon reservoir, but the methods may also be used for fracturing water wells, storage wells, injection wells, etc. Note also that some embodiments of the disclosure are described in terms of conventional circular perforations (for example, as created with shaped charges), normally having perforation tunnels. However, the disclosure is may also be practiced with other types of perforations, for example openings or slots cut into the tubing by jetting.

The term "fracturing conditions" means conditions of a fluid temperature up to 350° F., a fluid injection pressure up to about 15,000 pounds per square inch (psi), fluid injection rate up to 150 barrels per minute. In other situations, fracturing conditions pertain to conditions under which an oil and gas wells are fractured to increase gas and oil production from the well. The operating pressures may vary significantly. For example, oil and gas wells may cycle from a shut-in condition, in which the pressure within the well is maintained at a maximum, to a producing condition, in which the pressure within the well is much lower. Further, the flowing conditions can change resulting in cycles of a higher or lower pressure within the well. This "pressure cycling" of a hydraulically fractured well is known to cause damage to proppant in the fracture due to rearrangement and re-stressing of the proppant grains. This results in a less conductive proppant pack in the fracture and adversely impacts production performance of the well. Consequently a proppant that is resistant to pressure cycling conductivity loss is desirable. The conditions may include temperature, pressure and injection rate. The temperature is generally the well temperature, but heated or cooled fracturing fluids may be used to change the temperature. The pressures, while varying based on formation type, generally is greater than about 10,000 psi. In other embodiments, greater than about 15,000 psi. In other embodiments, greater than about 20,000 psi. In other embodiments, greater than about 25,000 psi. In other embodiments, greater than about 30,000 psi. The injection rate is designed to maintain the fracturing pressures during the fracturing operations, which may include a single injection or a plurality of injections, generally in a periodic manner. Completion conditions may be the same or different from fracturing conditions, but again will depend on the formation to be fractured.

The term "mixture" means an intimate combination of two or more components.

The term "combination" means a use of two material together, but not an intimate mixture such as using two different fluids components that are not mixed before hand.

The term "plurality" means two or more, more than two, greater than or equal to 2 (≥2).

The term "at least one" means one or a plurality, one or more, greater than or equal to 1 (≥1).

The term "gpt" means gallons per thousand gallons.

The term "ppt" means pounds per thousand gallons.

The term "wt. %" or "w/w" means percent by weight.

The term "vol. %" or "v/v" means percent by volume.

The term"v/w" means volume of a substance per unit of weight (mass) of another component.

DETAILED DESCRIPTION OF THE DISCLOSURE

The inventors have found that a new approach for hydrophobically modified proppant suspension including adding an effective amount of an aldehyde, a mixture of aldehydes, a ketone, a mixture of ketones, or mixtures or combinations thereof, wherein the effective amount is between about 1 ppm and about 1,000 ppm.

The inventors have also found that a method to model and understand the potential increase of the propped surface area, a fully integrated hydraulic fracturing, reservoir, and wellbore simulator with a black oil model has been developed. The model utilized a standard completion design under reservoir conditions to visualize and predict the potential increase in the propped surface area with and without the surface modified extremely hydrophobically proppant. Well A was modeled with a modified proppant suspension additive and Well B without. The fracture planes of Well A yielded almost two to four times more propped surface area than Well B at 100% coating efficiency under the reservoir conditions.

Embodiments of this disclosure broadly relate to enhancing hydrophobically modified proppant suspending compositions include an aldehyde, a mixture of aldehydes, a ketone, a mixture of ketones, or mixtures or combinations thereof present effective in an amount between about 1 ppm and 1,000 ppm. In certain embodiments, the enhancing proppant suspending compositions do not include a quaternary salt of the general formula $R^1R^2R^3ArN^+X^-$, wherein $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and about 40 carbon atoms, wherein one or more of the carbon atoms may be replace by an oxygen atom, Ar is an aryl group, alkaaryl groups, aralkyl groups, and mixtures thereof having between about 5 and about 40 carbon atoms, wherein one or more of the carbon atoms may be replaced with an oxygen atom, a nitrogen atom, a sulfur atoms, or mixtures thereof, and $X^-$ is a counterion.

Embodiments of this disclosure broadly relate to fracturing fluid compositions including an aqueous base fluid having a total dissolved solids above about 5,000 ppm, a friction reducer or a mixture of friction reducers, a high viscosity friction reducer or mixtures of high viscosity friction reducer and/or a viscosifying agent or mixture of viscosifying agents present in an amount between about 0.01% v/v to about 1.00% v/v, and an effective amount of an enhancing proppant suspending composition including an aldehyde, a mixture of aldehydes, a ketone, a mixture of ketones, or mixtures or combinations thereof, wherein the effective in an amount between about 1 ppm and about 1,000 ppm. In certain embodiments, the aqueous base fluid comprises a brackish water, a produced water, a flow back water, a reclaimed water, or mixtures and combinations thereof. In other embodiments, the compositions also include a crosslinking agent or a mixture of crosslinking agents, and/or a crosslinking delay agent or a mixture of crosslinking delay agents. In other embodiments, the enhancing proppant suspending compositions do not include a quaternary salt of the general formula $R^1R^2R^3ArN^+X^-$, wherein $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and about 40 carbon atoms, wherein one or more of the carbon atoms may be replace by an oxygen atom, Ar is an aryl group, alkaaryl groups, aralkyl groups, and mixtures thereof having between about 5 and about 40 carbon atoms, wherein one or more of the carbon atoms may be replaced with an oxygen atom, a nitrogen atom, a sulfur atoms, or mixtures thereof, and $X^-$ is a counterion.

Embodiments of this disclosure broadly relate to fracturing fluid compositions including an aqueous base fluid, a friction reducer or a mixture of friction reducers, a high viscosity friction reducer or mixtures of high viscosity friction reducer and/or a viscosifying agent or mixture of viscosifying agents present in an amount between about 0.01% v/v to about 1.00% v/v, an effective amount of an enhancing proppant suspending composition including an aldehyde, a mixture of aldehydes, a ketone, a mixture of ketones, or mixtures and combinations thereof, wherein the effective in an amount between about 1 ppm and about 1,000 ppm. In certain embodiments, a hydrophobically modified proppant, and a hydrophobic proppant coating composition comprising an organosilane, a fluoro-organosiloxane, a fluoro-organosilane, a siloxane, or mixtures and combinations thereof. In certain embodiments, the enhancing proppant suspending compositions do not include a quaternary salt of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and about 40 carbon atoms, wherein one or more of the carbon atoms may be replace by an oxygen atom, Ar is an aryl group, alkaaryl groups, aralkyl groups, and mixtures thereof having between about 5 and about 40 carbon atoms, wherein one or more of the carbon atoms may be replaced with an oxygen atom, a nitrogen atom, a sulfur atoms, or mixtures thereof, and $X^-$ is a counterion. In other embodiments, the aqueous base fluid comprises a brackish water, a produced water, a flow back water, a reclaimed water, or mixtures and combinations thereof. In other embodiments, the proppant comprises sand, a particulate ceramic, a resin coated sand, or mixtures and combinations thereof. In other embodiments, the fracturing fluid compositions may also include a crosslinking agent or a mixture of crosslinking agents, and/or a crosslinking delay agent or a mixture of crosslinking delay agents.

Embodiments of this disclosure broadly relate to methods of making hydrophobically modified proppant suspending compositions including blending an aqueous base fluid, and an effective amount of a hydrophobically modified proppant suspending composition hydrophobically modified proppant suspending composition including an aldehyde, a mixture of aldehydes, a ketone, a mixture of ketones, or mixtures or combinations thereof, wherein the effective in an amount between about 1 ppm and about 1,000 ppm. In certain embodiments, the aqueous base fluid comprises a brackish water, a produced water, a flow back water, a reclaimed water, or mixtures and combinations thereof. In other embodiments, the compositions may also include a crosslinking agent or a mixture of crosslinking agents, and/or a crosslinking delay agent or a mixture of crosslinking delay agents. In other embodiments, the hydrophobically modified proppant suspending compositions do not include a quaternary salt of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and about 40 carbon atoms, wherein one or more of the carbon atoms may be replace by an oxygen atom, Ar is an aryl group, alkaaryl groups, aralkyl groups, and mixtures thereof having between about 5 and about 40 carbon atoms, wherein one or more of the carbon atoms may be replaced with an oxygen atom, a nitrogen atom, a sulfur atoms, or mixtures thereof, and $X^-$ is a counterion.

Embodiments of this disclosure broadly relate to methods of making fracturing fluids including blending an aqueous base fluid, a friction reducer or a mixture of friction reducers, a high viscosity friction reducer or mixtures of high viscosity friction reducer and/or a viscosifying agent or mixture of viscosifying agents present in an amount between about 0.01% v/v to about 1.00% v/v, an effective amount of a hydrophobically modified proppant suspending composition proppant suspending composition including an aldehyde, a mixture of aldehydes, a ketone, a mixture of ketones, or mixtures or combinations thereof, and a hydrophobically modified proppant suspending composition proppant, wherein the effective in an amount between about 1 ppm and about 1,000 ppm. In certain embodiments, the aqueous base fluid comprises a brackish water, a produced water, a flow back water, a reclaimed water, or mixtures and combinations thereof. In certain embodiments, the fracturing fluids may also include a crosslinking agent or a mixture of crosslinking agents, and/or a crosslinking delay agent or a mixture of crosslinking delay agents. In other embodiments, the hydrophobically modified proppant suspending compositions do not include a quaternary salt of the general formula $R^1R^2R^3ArN^+X^-$, wherein $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and about 40 carbon atoms, wherein one or more of the carbon atoms may be replace by an oxygen atom, Ar is an aryl group, alkaaryl groups, aralkyl groups, and mixtures thereof having between about 5 and about 40 carbon atoms, wherein one or more of the carbon atoms may be replaced with an oxygen atom, a nitrogen atom, a sulfur atoms, or mixtures thereof, and $X^-$ is a counterion.

Embodiments of this disclosure broadly relate to methods of making fracturing fluids including forming a first fracturing fluid including blending an aqueous base fluid, a friction reducer or a mixture of friction reducers, a high viscosity friction reducer or mixtures of high viscosity friction reducer and/or a viscosifying agent or mixture of viscosifying agents present in an amount between about 0.01% v/v to about 1.00% v/v, and an effective amount of a hydrophobically modified proppant suspending composition including an aldehyde, a mixture of aldehydes, a ketone, a mixture of ketones, or mixtures or combinations thereof, wherein the effective in an amount between about 1 ppm and about 1,000 ppm, and forming a second fracturing fluid including a proppant carrier solution and a proppant, wherein the proppant carrier solution includes a hydrophobic proppant coating composition. In certain embodiments, the aqueous base fluid comprises a brackish water, a produced water, a flow back water, a reclaimed water, or mixtures and combinations thereof. In certain embodiments, the fracturing fluids may also include a crosslinking agent or a mixture of crosslinking agents, and/or a crosslinking delay agent or a mixture of crosslinking delay agents. In other embodiments, the hydrophobically modified proppant suspending compositions do not include a quaternary salt of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and about 40 carbon atoms, wherein one or more of the carbon atoms may be replace by an oxygen atom, Ar is an aryl group, alkaaryl groups, aralkyl groups, and mixtures thereof having between about 5 and about 40 carbon atoms, wherein one or more of the carbon atoms may be replaced with an oxygen atom, a nitrogen atom, a sulfur atoms, or mixtures thereof, and $X^-$ is a counterion.

Embodiments of this disclosure broadly relate to methods of fracturing a formation including pumping or injecting a fracturing fluid including an aqueous base fluid, a friction reducer or a mixture of friction reducers, a high viscosity friction reducer or mixtures of high viscosity friction reducer and/or a viscosifying agent or mixture of viscosifying agents present in an amount between about 0.01% v/v to about 1.00% v/v, an effective amount of a hydrophobically modified proppant suspending composition including an aldehyde, a mixture of aldehydes, a ketone, a mixture of ketones, or mixtures or combinations thereof, a hydrophobically modified proppant, and a proppant coating composition comprising an organosilane, a fluoro-organosiloxane, a fluoro-organosilane, a siloxane, or mixtures and combinations thereof, under fracturing conditions, wherein the effective in an amount between about 1 ppm and about 1,000 ppm. In certain embodiments, the aqueous base fluid comprises a brackish water, a produced water, a flow back water, a reclaimed water, or mixtures and combinations thereof. In certain embodiments, in the pumping step, the fluid further may also include a crosslinking agent or a mixture of crosslinking agents, and/or a crosslinking delay agent or a mixture of crosslinking delay agents. In other embodiments, the hydrophobically modified proppant suspending compositions do not include a quaternary salt of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and about 40 carbon atoms, wherein one or more of the carbon atoms may be replace by an oxygen atom, Ar is an aryl group, alkaaryl groups, aralkyl groups, and mixtures thereof having between about 5 and about 40 carbon atoms, wherein one or more of the carbon atoms may be replaced with an oxygen atom, a nitrogen atom, a sulfur atoms, or mixtures thereof, and $X^-$ is a counterion.

Embodiments of this disclosure broadly relate to methods of fracturing a formation including pumping a first fracturing fluid including an aqueous base fluid, a friction reducer or a mixture of friction reducers, a high viscosity friction reducer or mixtures of high viscosity friction reducer and/or a viscosifying agent or mixture of viscosifying agents present in an amount between about 0.01% v/v to about 1.00% v/v, and an effective amount of a hydrophobically modified proppant suspending composition including an aldehyde, a mixture of aldehydes, a ketone, a mixture of ketones, or mixtures or combinations thereof, under fracturing conditions, wherein the effective in an amount between about 1 ppm and about 1,000 ppm, and pumping a second fracturing fluid including a proppant carrier fluid and a hydrophobically modified proppant. In certain embodiments, the aqueous base fluid comprises a brackish water, a produced water, a flow back water, a reclaimed water, or mixtures and combinations thereof. In certain embodiments, the fracturing fluid may also include a crosslinking agent or a mixture of crosslinking agents, and/or a crosslinking delay agent or a mixture of crosslinking delay agents. In other embodiments, in the second pumping step, the proppant carrier fluid further including a proppant coating composition comprising an organosilane, a fluoro-organosiloxane, a fluoro-organosilane, a siloxane, or mixtures and combinations thereof. In other embodiments, the hydrophobically modified proppant suspending compositions do not include a quaternary salt of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and about 40 carbon atoms, wherein one or more of the carbon atoms may be replace by an oxygen atom, Ar is an aryl group, alkaaryl groups, aralkyl groups, and mixtures thereof having between about 5 and about 40 carbon atoms, wherein one or more of the carbon atoms may be replaced with an oxygen atom, a nitrogen atom, a sulfur atoms, or mixtures thereof, and $X^-$ is a counterion.

Proppant Suspending Compositions

Embodiments of this disclosure relate to proppant suspending compositions comprising an aldehyde, a mixture of aldehydes, a ketone, a mixture of ketones, or mixtures or combinations thereof, wherein the composition is adapted to be present in an effective amount between about 1 ppm and 1,000 ppm in an aqueous based fracturing fluid, wherein the aqueous base fluid include at least 5,000 ppm total dissolved solids, and wherein the composition does not include an ammonium based quaternary salt. In certain embodiments, the aldehydes are compounds of the formula R—CHO, wherein R is a hydrocarbyl group having between 1 and about 40 carbon atoms ($C_1$-$C_{40}$ aldehydes), and one or more of the carbon atoms may be replaced by oxygen atoms, and the ketones are compounds of the formula R'—C(O)—R", wherein R' and R" are independently a hydrocarbyl group having between 1 and about 40 carbon atoms ($C_1$-$C_{40}$ ketones), one or more of the carbon atoms may be replaced by oxygen atoms. In other embodiments, the aldehydes are selected from the group consisting of formaldehydes, ethanal, propanals, butanals, pentanals, hexanals, heptanals, octanals, nonanals, decanals, undecanals, dodecanals, tridecanals, tetradecanals, pentadecanals, higher alkanals, substituted analogs thereof, and mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the aldehydes are selected from the group consisting of (a) $C_1$ aldehydes including formaldehyde ($CH_2O$); (b) $C_2$ aldehydes including glyoxylic acid ($C_2H_2O_3$), chloroacetaldehyde ($C_2H_3ClO$), glyoxal ($C_2H_2O_2$), glycolaldehyde ($C_2H_4O_2$), fluoroacetaldehyde ($C_2H_3FO$), chloral ($C_2HCl_3O$), or acetaldehyde ($C_2H_4O$); (c) $C_3$ aldehydes including propionaldehydes or propanals ($C_3H_6O$), glyceraldehyde ($C_3H_6O_3$), malondialdehyde ($C_3H_4O_2$), lactaldehyde ($C_3H_6O_2$), or methylglyoxal ($C_3H_4O_2$); (d) $C_4$ aldehydes including butyraldehydes or butanals ($C_4H_8O$), succinaldehyde ($C_4H_6O_2$), 3-hydroxybutanal ($C_4H_8O_2$), isobutyraldehyde ($C_4H_8O$), or g-hydroxybutyraldehyde ($C_4H_8O_2$); (e) $C_5$ aldehydes including pentanals ($C_5H_{10}O$), trans-2-methyl-2-butenal ($C_5H_8O$), furfural ($C_5H_4O_2$), glutaconaldehyde ($C_5H_6O_2$), glutaraldehyde ($C_5H_8O_2$), isovaleraldehyde ($C_5H_{10}O$), or pivaldehyde ($C_5H_{10}O$); (f) $C_6$ aldehydes including hexanals ($C_6H_{12}O$), hydroxymethylfurfural ($C_6H_6O_3$), or cis-3-hexenal ($C_6H_{10}O$); (g) $C_7$ aldehydes including heptanals ($C_7H_{14}O$), phenolic aldehyde ($C_7H_6O_2$), methoxymethylfurfural ($C_7H_8O_3$), tetrahydrobenzaldehyde ($C_7H_{10}O$), or benzaldehyde ($C_7H_6O$); (h) $C_8$ aldehydes including octanals ($C_8H_{16}O$), phenylglyoxal ($C_8H_6O_2$), 3,4-dihydroxyphenylacetaldehyde ($C_8H_8O_3$), or phenylacetaldehyde ($C_8H_8O$); (i) $C_9$ aldehydes including nonanals ($C_9H_{18}O$), 2-nitrocinnamaldehyde ($C_9H_7O_3N$), 4-oxo-2-nonenal ($C_9H_{14}O_2$), cinnamaldehyde ($C_9H_8O$), or 4-hydroxynonenal ($C_9H_{16}O_2$); (j) $C_{10}$ aldehydes including decanals ($C_{10}H_{20}O$), citral ($C_{10}H_{16}O$), hydroxycitronellal ($C_{10}H_{20}O_2$), 4-methoxycinnamaldehyde ($C_{10}H_{10}O_2$), safranal ($C_{10}H_{14}O$), 8-oxogeranial ($C_{10}H_{14}O_2$), or citronellal ($C_{10}H_{18}O$); (k) $C_{11}$ aldehydes including undecanals ($C_{11}H_{22}O$), helional ($C_{11}H_{12}O_3$), nitrophenyl pentadienal ($C_{11}H_9NO_3$), or sinapaldehyde ($C_{11}H_{12}O_4$); (l) $C_{12}$ aldehydes including dodecanals ($C_{11}H_{24}O$); (m) $C_{13}$ aldehydes including tridecanals ($C_{13}H_{26}O$), bourgeonal ($C_{13}H_{18}O$), or hydroxymethylpentylcyclohexenecarboxaldehyde ($C_{13}H_{22}O_2$); (n) $C_{14}$ aldehydes including tetradecanes ($C_{14}H_{28}O$) or lilial ($C_{14}H_{20}O$); (o) $C_{15}$ aldehydes including pentadecanes ($C_{15}H_{30}O$), hexyl cinnamaldehyde ($C_{15}H_{20}O$), abscisic aldehyde ($C_{15}H_{20}O_3$), velleral ($C_{15}H_{20}O_2$), or polygodial ($C_{15}H_{22}O_2$); (p) $C_{16}$ aldehydes including hexadencanals ($C_{16}H_{32}O$) or callicarpenal ($C_{16}H_{26}O$); (q) $C_{17}$ aldehydes including hetadecanals ($C_{17}H_{34}O$), botrydial ($C_{17}H_{26}O_5$), or oleocanthal ($C_{17}H_{20}O_5$); (r) $C_{18}$ aldehydes including octadecanals ($C_{18}H_{36}O$); (s) $C_{19}$ aldehydes including nonadecanals ($C_{19}H_{38}O$); (t) $C_{20}$ aldehydes including icosanals ($C_{20}H_{40}O$) or retinal ($C_{20}H_{28}O$), substituted analogous thereof, and mixtures or combinations thereof, (u) substituted analogous thereof, and (v) mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the quaternary salt comprises compounds of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, Ar is an aryl group, alkaaryl groups, aralkyl groups, and mixtures thereof having between 5 and 40 carbon atoms, wherein one or more of the carbon atoms may be replaced with an oxygen atom, a nitrogen atom, a sulfur atoms, or mixtures thereof, and $X^-$ is a counterion.

Fracturing Fluids Including a Proppant Suspending Composition

Embodiments of this disclosure relate to fracturing fluid compositions comprising (a) an aqueous base fluid having a total dissolved solids above about 5,000 ppm, (b) a friction reducer or a mixture of friction reducers, a high viscosity friction reducer or mixtures of high viscosity friction reducer and/or a viscosifying agent or mixture of viscosifying agents present in an amount between about 0.01% v/v to about 1.00% v/v, and (c) an effective amount of an proppant suspending composition including an aldehyde, a mixture of aldehydes, a ketone, a mixture of ketones, or mixtures or combinations thereof, wherein the effective in an amount between about 1 ppm and about 1,000 ppm. In certain embodiments, the aqueous base fluid comprises a brackish water, a produced water, a flow back water, a reclaimed water, or mixtures and combinations thereof. In certain embodiments, the aldehydes are compounds of the formula R—CHO, wherein R is a hydrocarbyl group having between 1 and about 40 carbon atoms ($C_1$-$C_{40}$ aldehydes), and one or more of the carbon atoms may be replaced by oxygen atoms, and the ketones are compounds of the formula R'—C(O)—R", wherein R' and R" are independently a hydrocarbyl group having between 1 and about 40 carbon atoms ($C_1$-$C_{40}$ ketones), one or more of the carbon atoms may be replaced by oxygen atoms. In other embodiments, the aldehydes are selected from the group consisting of formaldehydes, ethanal, propanals, butanals, pentanals, hexanals, heptanals, octanals, nonanals, decanals, undecanals, dodecanals, tridecanals, tetradecanals, pentadecanals, higher alkanals, substituted analogs thereof, and mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the aldehydes are selected from the group consisting of (a) $C_1$ aldehydes including formaldehyde ($CH_2O$); (b) $C_2$ aldehydes including glyoxylic acid ($C_2H_2O_3$), chloroacetaldehyde ($C_2H_3ClO$), glyoxal ($C_2H_2O_2$), glycolaldehyde ($C_2H_4O_2$), fluoroacetaldehyde ($C_2H_3FO$), chloral ($C_2HCl_3O$), or acetaldehyde ($C_2H_4O$); (c) $C_3$ aldehydes including propionaldehydes or propanals ($C_3H_6O$), glyceraldehyde ($C_3H_6O_3$), malondialdehyde ($C_3H_4O_2$), lactaldehyde ($C_3H_6O_2$), or methylglyoxal ($C_3H_4O_2$); (d) $C_4$ aldehydes including butyraldehydes or butanals ($C_4H_8O$), succinaldehyde ($C_4H_6O_2$), 3-hydroxybutanal ($C_4H_8O_2$), isobutyraldehyde ($C_4H_8O$), or g-hydroxybutyraldehyde ($C_4H_8O_2$); (e) $C_5$ aldehydes including pentanals ($C_5H_{10}O$), trans-2-methyl-2-butenal ($C_5H_8O$), furfural ($C_5H_4O_2$), glutaconaldehyde ($C_5H_6O_2$), glutaraldehyde ($C_5H_8O_2$), isovaleraldehyde ($C_5H_{10}O$), or pivaldehyde ($C_5H_{10}O$); (f) $C_6$ aldehydes including hexanals ($C_6H_{12}O$), hydroxymethylfurfural ($C_6H_6O_3$), or cis-3-hexenal ($C_6H_{10}O$); (g) $C_7$ aldehydes including heptanals ($C_7H_{14}O$), phenolic aldehyde ($C_7H_6O_2$), methoxymethylfurfural ($C_7H_8O_3$), tetrahydrobenzaldehyde ($C_7H_{10}O$), or benzaldehyde ($C_7H_6O$); (h) $C_8$ aldehydes including octanals ($C_8H_{16}O$), phenylglyoxal ($C_8H_6O_2$), 3,4-dihydroxyphenylacetaldehyde ($C_8H_8O_3$), or phenylacetaldehyde ($C_8H_8O$); (i) $C_9$ aldehydes including nonanals ($C_9H_{18}O$), 2-nitrocinnamaldehyde ($C_9H_7O_3N$), 4-oxo-2-nonenal ($C_9H_{14}O_2$), cinnamaldehyde ($C_9H_8O$), or 4-hydroxynonenal ($C_9H_{16}O_2$); (j) $C_{10}$ aldehydes including decanals ($C_{10}H_{20}O$), citral ($C_{10}H_{16}O$), hydroxycitronellal ($C_{10}H_{20}O_2$), 4-methoxycinnamaldehyde ($C_{10}H_{10}O_2$), safranal ($C_{10}H_{14}O$), 8-oxogeranial ($C_{10}H_{14}O_2$), or citronellal ($C_{10}H_{18}O$); (k) $C_{11}$ aldehydes including undecanals ($C_{11}H_{22}O$), helional ($C_{11}H_{12}O_3$), nitrophenyl pentadienal ($C_{11}H_9NO_3$), or sinapaldehyde ($C_{11}H_{12}O_4$); (l) $C_{12}$ aldehydes including dodecanals ($C_{12}H_{24}O$); (m) $C_{13}$ aldehydes including tridecanals ($C_{13}H_{26}O$), bourgeonal ($C_{13}H_{18}O$), or hydroxymethylpentylcyclohexenecarboxaldehyde ($C_{13}H_{22}O_2$); (n) $C_{14}$ aldehydes including tetradecanes ($C_{14}H_{28}O$) or lilial ($C_{14}H_{20}O$); (o) $C_{15}$ aldehydes including pentadecanes ($C_{15}H_{30}O$), hexyl cinnamaldehyde ($C_{15}H_{20}O$), abscisic aldehyde ($C_{15}H_{20}O_3$), velleral ($C_{15}H_{20}O_2$), or polygodial ($C_{15}H_{22}O_2$); (p) $C_{16}$ aldehydes including hexadencanals ($C_{16}H_{32}O$) or callicarpenal ($C_{16}H_{26}O$); (q) $C_{17}$ aldehydes including hetadecanals ($C_{17}H_{34}O$), botrydial ($C_{17}H_{26}O_5$), or oleocanthal ($C_{17}H_{20}O_5$); (r) $C_{18}$ aldehydes including octadecanals ($C_{18}H_{36}O$); (s) $C_{19}$ aldehydes including nonadecanals ($C_{19}H_{38}O$); (t) $C_{20}$ aldehydes including icosanals ($C_{20}H_{40}O$) or retinal ($C_{20}H_{28}O$), substituted analogous thereof, and mixtures or combinations thereof, (u) substituted analogous thereof, and (v) mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the quaternary salt comprises compounds of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, Ar is an aryl group, alkaaryl groups, aralkyl groups, and mixtures thereof having between 5 and 40 carbon atoms, wherein one or more of the carbon atoms may be replaced with an oxygen atom, a nitrogen atom, a sulfur atoms, or mixtures thereof, and $X^-$ is a counterion. In other embodiments, the aqueous base fluid comprises a brackish water, a produced water, a flow back water, a reclaimed water, or mixtures and combinations thereof. In other embodiments, the fracturing fluid further includes a crosslinking agent or a mixture of crosslinking agents including borates, borates related crosslinkers, zirconates, zirconate derivatives, aluminates, aluminate derivatives, or mixtures thereof, or a crosslinking agent or a mixture of crosslinking agents including borates, borates related crosslinkers, zirconates, zirconate derivatives, aluminates, aluminate derivatives, or mixtures thereof, and a crosslinking delay agent or a mixture of crosslinking delay agents.

Embodiments of this disclosure relate to fracturing fluid compositions comprising (a) an aqueous base fluid having a total dissolved solids above about 5,000 ppm, (b) a friction reducer or a mixture of friction reducers, a high viscosity friction reducer or mixtures of high viscosity friction reducer and/or a viscosifying agent or mixture of viscosifying agents present in an amount between about 0.01% v/v to about 1.00% v/v, (c) an effective amount of an proppant suspending composition including an aldehyde, a mixture of aldehydes, a ketone, a mixture of ketones, or mixtures and combinations thereof, wherein the effective in an amount between about 1 ppm and about 1,000 ppm, (d) one or more proppant, and (e) optionally a hydrophobic proppant coating composition comprising an organosilane, a fluoro-organosiloxane, a fluoro-organosilane, a siloxane, or mixtures and combinations thereof, wherein the proppant is precoated or coated in a slurry prior to blending with the hydrophobic proppant coating composition. In certain embodiments, the aldehydes are compounds of the formula R—CHO, wherein R is a hydrocarbyl group having between 1 and about 40 carbon atoms ($C_1$-$C_{40}$ aldehydes), and one or more of the carbon atoms may be replaced by oxygen atoms, and the ketones are compounds of the formula R'—C(O)—R", wherein R' and R" are independently a hydrocarbyl group having between 1 and about 40 carbon atoms ($C_1$-$C_{40}$ ketones), one or more of the carbon atoms may be replaced by oxygen atoms. In other embodiments, the aldehydes are selected from the group consisting of formaldehydes, ethanal, propanals, butanals, pentanals, hexanals, heptanals, octanals, nonanals, decanals, undecanals, dodecanals, tridecanals, tetradecanals, pentadecanals, higher alkanals, substituted analogs thereof, and mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the aldehydes are selected from the group consisting of (a) $C_1$ aldehydes including formaldehyde ($CH_2O$); (b) $C_2$ aldehydes including glyoxylic acid ($C_2H_2O_3$), chloroacetaldehyde ($C_2H_3ClO$), glyoxal ($C_2H_2O_2$), glycolaldehyde ($C_2H_4O_2$), fluoroacetaldehyde ($C_2H_3FO$), chloral ($C_2HCl_3O$), or acetaldehyde ($C_2H_4O$); (c) $C_3$ aldehydes including propionaldehydes or propanals ($C_3H_6O$), glyceraldehyde ($C_3H_6O_3$), malondialdehyde ($C_3H_4O_2$), lactaldehyde ($C_3H_6O_2$), or methylglyoxal ($C_3H_4O_2$); (d) $C_4$ aldehydes including butyraldehydes or butanals ($C_4H_8O$), succinaldehyde ($C_4H_6O_2$), 3-hydroxybutanal ($C_4H_8O_2$), isobutyraldehyde ($C_4H_8O$), or g-hydroxybutyraldehyde ($C_4H_8O_2$); (e) $C_5$ aldehydes including pentanals ($C_5H_{10}O$), trans-2-methyl-2-butenal ($C_5H_8O$), furfural ($C_5H_4O_2$), glutaconaldehyde ($C_5H_6O_2$), glutaraldehyde ($C_5H_8O_2$), isovaleraldehyde ($C_5H_{10}O$), or pivaldehyde ($C_5H_{10}O$); (f) $C_6$ aldehydes including hexanals ($C_6H_{12}O$), hydroxymethylfurfural ($C_6H_6O_3$), or cis-3-hexenal ($C_6H_{10}O$); (g) $C_7$ aldehydes including heptanals ($C_7H_{14}O$), phenolic aldehyde ($C_7H_6O_2$), methoxymethylfurfural ($C_7H_8O_3$), tetrahydrobenzaldehyde ($C_7H_{10}O$), or benzaldehyde ($C_7H_6O$); (h) $C_8$ aldehydes including octanals ($C_8H_{16}O$), phenylglyoxal ($C_8H_6O_2$), 3,4-dihydroxyphenylacetaldehyde ($C_8H_8O_3$), or phenylacetaldehyde ($C_8H_8O$); (i) $C_9$ aldehydes including nonanals ($C_9H_{18}O$), 2-nitrocinnamaldehyde ($C_9H_7O_3N$), 4-oxo-2-nonenal ($C_9H_{14}O_2$), cinnamaldehyde ($C_9H_8O$), or 4-hydroxynonenal ($C_9H_{16}O_2$); (j) $C_{10}$ aldehydes including decanals ($C_{10}H_{20}O$), citral ($C_{10}H_{16}O$), hydroxycitronellal ($C_{10}H_{20}O_2$), 4-methoxycinnamaldehyde ($C_{10}H_{10}O_2$), safranal ($C_{10}H_{14}O$), 8-oxogeranial ($C_{10}H_{14}O_2$), or citronellal ($C_{10}H_{18}O$); (k) $C_{11}$ aldehydes including undecanals ($C_{11}H_{22}O$), helional ($C_{11}H_{12}O_3$), nitrophenyl pentadienal ($C_{11}H_9NO_3$), or sinapaldehyde ($C_{11}H_{12}O_4$); (l) $C_{12}$ aldehydes including dodecanals ($C_{12}H_{24}O$); (m) $C_{13}$ aldehydes including tridecanals ($C_{13}H_{26}O$), bourgeonal ($C_{13}H_{18}O$), or hydroxymethylpentylcyclohexenecarboxaldehyde ($C_{13}H_{22}O_2$); (n) $C_{14}$ aldehydes including tetradecanes ($C_{14}H_{28}O$) or lilial ($C_{14}H_{20}O$); (o) $C_{15}$ aldehydes including pentadecanes ($C_{15}H_{30}O$), hexyl cinnamaldehyde ($C_{15}H_{20}O$), abscisic aldehyde ($C_{15}H_{20}O_3$), velleral ($C_{15}H_{20}O_2$), or polygodial ($C_{15}H_{22}O_2$); (p) $C_{16}$ aldehydes including hexadencanals ($C_{16}H_{32}O$) or callicarpenal ($C_{16}H_{26}O$); (q) $C_{12}$ aldehydes including hetadecanals ($C_{17}H_{34}O$), botrydial ($C_{17}H_{26}O_5$), or oleocanthal ($C_{17}H_{20}O_5$); (r) $C_{18}$ aldehydes including octadecanals ($C_{18}H_{36}O$); (s) $C_{19}$ aldehydes including nonadecanals ($C_{19}H_{38}O$); (t) $C_{20}$ aldehydes including icosanals ($C_{20}H_{40}O$) or retinal ($C_{20}H_{28}O$), substituted analogous thereof, and mixtures or combinations thereof, (u) substituted analogous thereof, and (v) mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the quaternary salt comprises compounds of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, Ar is an aryl group, alkaaryl groups, aralkyl groups, and mixtures thereof having between 5 and 40 carbon atoms, wherein one or more of the carbon atoms may be replaced with an oxygen atom, a nitrogen atom, a sulfur atoms, or mixtures thereof, and $X^-$ is a counterion. In other embodiments, the aqueous base fluid comprises a brackish water, a produced water, a flow back water, a reclaimed water, or mixtures and combinations thereof. In other embodiments, the fracturing fluid further includes a crosslinking agent or a mixture of crosslinking agents including borates, borates related crosslinkers, zirconates, zirconate derivatives, aluminates, aluminate derivatives, or mixtures thereof, or a crosslinking agent or a mixture of crosslinking agents including borates, borates related crosslinkers, zirconates, zirconate derivatives, aluminates, aluminate derivatives, or mixtures thereof, and a crosslinking delay agent or a mixture of crosslinking delay agents. In other embodiments, the one or more proppants are precoated or coated in a slurry with a hydrophobic proppant treating composition to form hydrophobically modified proppants, and the hydrophobic proppant treating composition comprising an organosilane, a fluoro-organosiloxane, a fluoro-organosilane, a siloxane, or mixtures and combinations thereof Methods of Making Embodiments of this disclosure relate to methods of making fracturing fluids comprising blending an aqueous base fluid, a friction reducer or a mixture of friction reducers, a high viscosity friction reducer or mixtures of high viscosity friction reducer and/or a viscosifying agent or mixture of viscosifying agents present in an amount between about 0.01% v/v to about 1.00% v/v, an effective amount of an enhancing proppant suspending composition including an aldehyde, a mixture of aldehydes, a ketone, a mixture of ketones, or mixtures or combinations thereof, wherein the effective in an amount between about 1 ppm and about 1,000 ppm, and a hydrophobically modified proppant. In certain embodiments, the aqueous base fluid comprises a brackish water, a produced water, a flow back water, a reclaimed water, or mixtures and combinations thereof. In certain embodiments, the aldehydes are compounds of the formula R—CHO, wherein R is a hydrocarbyl group having between 1 and about 40 carbon atoms ($C_1$-$C_{40}$ aldehydes), and one or more of the carbon atoms may be replaced by oxygen atoms, and the ketones are compounds of the formula R'—C(O)—R", wherein R' and R" are independently a hydrocarbyl group having between 1 and about 40 carbon atoms ($C_1$-$C_{40}$ ketones), one or more of the carbon atoms may be replaced by oxygen atoms. In other embodiments, the aldehydes are selected from the group consisting of formaldehydes, ethanal, propanals, butanals, pentanals, hexanals, heptanals, octanals, nonanals, decanals, undecanals, dodecanals, tridecanals, tetradecanals, pentadecanals, higher alkanals, substituted analogs thereof, and mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the quaternary salt comprises compounds of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, Ar is an aryl group, alkaaryl groups, aralkyl groups, and mixtures thereof having between 5 and 40 carbon atoms, wherein one or more of the carbon atoms may be replaced with an oxygen atom, a nitrogen atom, a sulfur atoms, or mixtures thereof, and $X^-$ is a counterion. In other embodiments, the aqueous base fluid comprises a brackish water, a produced water, a flow back water, a reclaimed water, or mixtures and combinations thereof. In other embodiments, the fracturing fluid further includes a crosslinking agent or a mixture of crosslinking agents including borates, borates related crosslinkers, zirconates, zirconate derivatives, aluminates, aluminate derivatives, or mixtures thereof, or a crosslinking agent or a mixture of crosslinking agents including borates, borates related crosslinkers, zirconates, zirconate derivatives, aluminates, aluminate derivatives, or mixtures thereof, and a crosslinking delay agent or a mixture of crosslinking delay agents. In other embodiments, the one or more proppants are precoated or coated in a slurry with a hydrophobic proppant treating composition to form hydrophobically modified proppants, and the hydrophobic proppant treating composition comprising an organosilane, a fluoro-organosiloxane, a fluoro-organosilane, a siloxane, or mixtures and combinations thereof Methods of Fracturing Embodiments of this disclosure relate to methods of making fracturing fluids comprising: forming a first fracturing fluid including blending an aqueous base fluid, a friction reducer or a mixture of friction reducers, a high viscosity friction reducer or mixtures of high viscosity friction reducer and/or a viscosifying agent or mixture of viscosifying agents, and an effective amount of an enhancing proppant suspending composition including an aldehyde, a mixture of aldehydes, a ketone, a mixture of ketones, or mixtures or combinations thereof, wherein the effective in an amount between about 1 ppm and 1,000 ppm, and forming a second fracturing fluid including a proppant carrier solution including a hydrophobic rendering proppant coating composition comprising an organosilane, a fluoro-organosiloxane, a fluoro-organosilane, a siloxane, or mixtures and combinations thereof, and a proppant to form a hydrophobically modified proppant. In certain embodiments, the aqueous base fluid comprises a brackish water, a produced water, a flow back water, a reclaimed water, or mixtures and combinations thereof. In certain embodiments, the aldehydes are compounds of the formula R—CHO, wherein R is a hydrocarbyl group having between 1 and about 40 carbon atoms ($C_1$-$C_{40}$ aldehydes), and one or more of the carbon atoms may be replaced by oxygen atoms, and the ketones are compounds of the formula R'—C(O)—R", wherein R' and R" are independently a hydrocarbyl group having between 1 and about 40 carbon atoms ($C_1$-$C_{40}$ ketones), one or more of the carbon atoms may be replaced by oxygen atoms. In other embodiments, the aldehydes are selected from the group consisting of formaldehydes, ethanal, propanals, butanals, pentanals, hexanals, heptanals, octanals, nonanals, decanals, undecanals, dodecanals, tridecanals, tetradecanals, pentadecanals, higher alkanals, substituted analogs thereof, and mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the quaternary salt comprises compounds of the general formula $R^1R^2R^3ArN^+X^-$, wherein $R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, Ar is an aryl group, alkaaryl groups, aralkyl groups, and mixtures thereof having between 5 and 40 carbon atoms, wherein one or more of the carbon atoms may be replaced with an oxygen atom, a nitrogen atom, a sulfur atoms, or mixtures thereof, and $X^-$ is a counterion. In other embodiments, the aqueous base fluid comprises a brackish water, a produced water, a flow back water, a reclaimed water, or mixtures and combinations thereof. In other embodiments, the fracturing fluid further includes a crosslinking agent or a mixture of crosslinking agents including borates, borates related crosslinkers, zirconates, zirconate derivatives, aluminates, aluminate derivatives, or mixtures thereof, or a crosslinking agent or a mixture of crosslinking agents including borates, borates related crosslinkers, zirconates, zirconate derivatives, aluminates, aluminate derivatives, or mixtures thereof, and a crosslinking delay agent or a mixture of crosslinking delay agents. In other embodiments, the one or more proppants are precoated or coated in a slurry with a hydrophobic proppant treating composition to form hydrophobically modified proppants, and the hydrophobic proppant treating composition comprising an organosilane, a fluoro-organosiloxane, a fluoro-organosilane, a siloxane, or mixtures and combinations thereof.

Embodiments of this disclosure relate to methods of fracturing a formation comprising pumping or injecting, under fracturing conditions, a fracturing fluid including an aqueous base fluid, a friction reducer or a mixture of friction reducers, a high viscosity friction reducer or mixtures of high viscosity friction reducer and/or a viscosifying agent or mixture of viscosifying agents, an effective amount of an enhancing proppant suspending composition including an aldehyde, a mixture of aldehydes, a ketone, a mixture of ketones, or mixtures or combinations thereof, wherein the effective in an amount between about 1 ppm and 1,000 ppm, one or more proppants, and a hydrophobic rendering proppant coating composition comprising an organosilane, a fluoro-organosiloxane, a fluoro-organosilane, a siloxane, or mixtures and combinations thereof to form a hydrophobically modified proppant, wherein the proppant is precoated or coated in a slurry prior to blending with other components. In certain embodiments, the aqueous base fluid comprises a brackish water, a produced water, a flow back water, a reclaimed water, or mixtures and combinations thereof. In certain embodiments, the aldehydes are compounds of the formula R—CHO, wherein R is a hydrocarbyl group having between 1 and about 40 carbon atoms ($C_1$-$C_{40}$ aldehydes), and one or more of the carbon atoms may be replaced by oxygen atoms, and the ketones are compounds of the formula R'—C(O)—R", wherein R' and R" are independently a hydrocarbyl group having between 1 and about 40 carbon atoms ($C_1$-$C_{40}$ ketones), one or more of the carbon atoms may be replaced by oxygen atoms. In other embodiments, the aldehydes are selected from the group consisting of formaldehydes, ethanal, propanals, butanals, pentanals, hexanals, heptanals, octanals, nonanals, decanals, undecanals, dodecanals, tridecanals, tetradecanals, pentadecanals, higher alkanals, substituted analogs thereof, and mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the quaternary salt comprises compounds of the general formula $R^1R^2R^3ArN^+X^-$, wherein $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, Ar is an aryl group, alkaaryl groups, aralkyl groups, and mixtures thereof having between 5 and 40 carbon atoms, wherein one or more of the carbon atoms may be replaced with an oxygen atom, a nitrogen atom, a sulfur atoms, or mixtures thereof, and $X^-$ is a counterion. In other embodiments, the aqueous base fluid comprises a brackish water, a produced water, a flow back water, a reclaimed water, or mixtures and combinations thereof. In other embodiments, the fracturing fluid further includes a crosslinking agent or a mixture of crosslinking agents including borates, borates related crosslinkers, zirconates, zirconate derivatives, aluminates, aluminate derivatives, or mixtures thereof, or a crosslinking agent or a mixture of crosslinking agents including borates, borates related crosslinkers, zirconates, zirconate derivatives, aluminates, aluminate derivatives, or mixtures thereof, and a crosslinking delay agent or a mixture of crosslinking delay agents. In other embodiments, the one or more proppants are precoated or coated in a slurry with a hydrophobic proppant treating composition to form hydrophobically modified proppants, and the hydrophobic proppant treating composition comprising an organosilane, a fluoro-organosiloxane, a fluoro-organosilane, a siloxane, or mixtures and combinations thereof.

Embodiments of this disclosure relate to methods of fracturing a formation comprising pumping, under fracturing conditions, a first fracturing fluid including: an aqueous base fluid, a friction reducer or a mixture of friction reducers, a high viscosity friction reducer or mixtures of high viscosity friction reducer and/or a viscosifying agent or mixture of viscosifying agents, and an effective amount of an enhancing proppant suspending composition including an aldehyde, a mixture of aldehydes, a ketone, a mixture of ketones, or mixtures or combinations thereof, wherein the effective in an amount between about 1 ppm and 1,000 ppm, and pumping, under fracturing conditions, a second fracturing fluid including: a proppant carrier fluid including a hydrophobic rendering proppant coating composition comprising an organosilane, a fluoro-organosiloxane, a fluoro-organosilane, a siloxane, or mixtures and combinations thereof and a proppant to form a hydrophobically modified proppant. In certain embodiments, the aqueous base fluid comprises a brackish water, a produced water, a flow back water, a reclaimed water, or mixtures and combinations thereof. In certain embodiments, the aldehydes are compounds of the formula R—CHO, wherein R is a hydrocarbyl group having between 1 and about 40 carbon atoms ($C_1$-$C_{40}$ aldehydes), and one or more of the carbon atoms may be replaced by oxygen atoms, and the ketones are compounds of the formula R'—C(O)—R", wherein R' and R" are independently a hydrocarbyl group having between 1 and about 40 carbon atoms ($C_1$-$C_{40}$ ketones), one or more of the carbon atoms may be replaced by oxygen atoms. In other embodiments, the aldehydes are selected from the group consisting of formaldehydes, ethanal, propanals, butanals, pentanals, hexanals, heptanals, octanals, nonanals, decanals, undecanals, dodecanals, tridecanals, tetradecanals, pentadecanals, higher alkanals, substituted analogs thereof, and mixtures or combinations thereof, and the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof. In other embodiments, the quaternary salt comprises compounds of the general formula $R^1R^2R^3ArN^+X^-$, wherein $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom, Ar is an aryl group, alkaaryl group, aralkyl groups, and mixtures thereof having between 5 and 40 carbon atoms, wherein one or more of the carbon atoms may be replaced with an oxygen atom, a nitrogen atom, a sulfur atoms, or mixtures thereof, and $X^-$ is a counterion. In other embodiments, the aqueous base fluid comprises a brackish water, a produced water, a flow back water, a reclaimed water, or mixtures and combinations thereof. In other embodiments, the fracturing fluid further includes a crosslinking agent or a mixture of crosslinking agents including borates, borates related crosslinkers, zirconates, zirconate derivatives, aluminates, aluminate derivatives, or mixtures thereof, or a crosslinking agent or a mixture of crosslinking agents including borates, borates related crosslinkers, zirconates, zirconate derivatives, aluminates, aluminate derivatives, or mixtures thereof, and a crosslinking delay agent or a mixture of crosslinking delay agents. In other embodiments, the one or more proppants are precoated or coated in a slurry with a hydrophobic proppant treating composition to form hydrophobically modified proppants, and the hydrophobic proppant treating composition comprising an organosilane, a fluoro-organosiloxane, a fluoro-organosilane, a siloxane, or mixtures and combinations thereof.

Compositional Ranges of the Disclosure

Proppant Suspending Compositions

Embodiments of this disclosure include a proppant suspending composition including between about 1 ppm and about 1,000 ppm, between about 1 ppm and about 900 ppm, between about 1 ppm and about 800 ppm, between about 1 ppm and about 700 ppm, between about 1 ppm and about 600 ppm, between about 1 ppm and about 500 ppm, between about 1 ppm and about 400 ppm, between about 1 ppm and about 300 ppm, between about 1 ppm and about 200 pmm, between about 1 ppm and about 100 pmm, between about 5 ppm and about 100 pmm, between about 10 ppm and about 100 pmm, between about 15 ppm and about 100 pmm, between about 20 ppm and about 100 pmm, between about 25 ppm and about 100 pmm, and any value within the ranges.

Fracturing Fluids

Generally, a fracturing fluid treatment involves pumping a low or high viscosity fluid into a formation including a proppant, although the proppant may be pumped-in later, as a free viscous fluid, or pad, usually water with some fluid additives to generate high viscosity, into a formation at a rate faster than the fluid can escape into the formation so that the pressure rises and the rock of the formation fractures or breaks, creating artificial fractures and/or enlarging existing fractures. During or after fracturing the formation, the propping agent, generally a solid material such as sand is added to the fluid to form a slurry that is pumped into the newly formed fractures in the formation to prevent them from closing when the pumping pressure is released.

The liquid carrier can generally be any liquid carrier suitable for use in oil and gas producing wells. In certain embodiments, the liquid carrier is water and an aqueous base fluid wherein water is typically the major component by weight of the fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt (NaCl, KCl, etc.) has been added.

Suitable Reagents/Devices Used in the Disclosure

Aldehydes

Suitable aldehydes for use in the present disclosure include, without limitation, linear, branched, saturated, unsaturated, cyclic, or aromatic aldehydes of the general formula R—CHO, where R is a hydrocarbyl group having between 1 and about 40 carbon atoms ($C_1$-$C_{40}$ aldehydes), wherein one or more of the carbon atoms may be replaced by oxygen atoms. Exemplary aldehydes include, without limitation, formaldehydes, ethanal, propanal, butanal, pentanal, hexanal, heptanal, octanal, nonanal, decanal, undecanal, dodecanal, tridecanal, tetradecanal, pentadecanal, higher alkanals, and substituted analogs thereof. Other aldehydes include, without limitation: (a) $C_1$ aldehydes including formaldehyde ($CH_2O$); (b) $C_2$ aldehydes including glyoxylic acid ($C_2H_2O_3$), chloroacetaldehyde ($C_2H_3ClO$), glyoxal ($C_2H_2O_2$), glycolaldehyde ($C_2H_4O_2$), fluoroacetaldehyde ($C_2H_3FO$), chloral ($C_2HCl_3O$), or acetaldehyde ($C_2H_4O$); (c) $C_3$ aldehydes including propionaldehydes or propanals ($C_3H_6O$), glyceraldehyde ($C_3H_6O_3$), malondialdehyde ($C_3H_4O_2$), lactaldehyde ($C_3H_6O_2$), or methylglyoxal ($C_3H_4O_2$); (d) $C_4$ aldehydes including butyraldehydes or butanals ($C_4H_8O$), succinaldehyde ($C_4H_6O_2$), 3-hydroxybutanal ($C_4H_8O_2$), isobutyraldehyde ($C_4H_8O$), or g-hydroxybutyraldehyde ($C_4H_8O_2$); (e) $C_5$ aldehydes including pentanals ($C_5H_{10}O$), trans-2-methyl-2-butenal ($C_5H_8O$), furfural ($C_5H_4O_2$), glutaconaldehyde ($C_5H_6O_2$), glutaraldehyde ($C_5H_8O_2$), isovaleraldehyde ($C_5H_{10}O$), or pivaldehyde ($C_5H_{10}O$); (f) $C_6$ aldehydes including hexanals ($C_6H_{12}O$), hydroxymethylfurfural ($C_6H_6O_3$), or cis-3-hexenal ($C_6H_{10}O$); (g) $C_7$ aldehydes including heptanals ($C_7H_{14}O$), phenolic aldehyde ($C_7H_6O_2$), methoxymethylfurfural ($C_7H_8O_3$), tetrahydrobenzaldehyde ($C_7H_{10}O$), or benzaldehyde ($C_7H_6O$); (h) $C_8$ aldehydes including octanals ($C_8H_{16}O$), phenylglyoxal ($C_8H_6O_2$), 3,4-dihydroxyphenylacetaldehyde ($C_8H_8O_3$), or phenylacetaldehyde ($C_8H_8O$); (i) $C_9$ aldehydes including nonanals ($C_9H_{18}O$), 2-nitrocinnamaldehyde ($C_9H_7O_3N$), 4-oxo-2-nonenal ($C_9H_{14}O_2$), cinnamaldehyde ($C_9H_8O$), or 4-hydroxynonenal ($C_9H_{16}O_2$); (j) $C_{10}$ aldehydes including decanals ($C_{10}H_{20}O$), citral ($C_{10}H_{16}O$), hydroxycitronellal ($C_{10}H_{20}O_2$), 4-methoxycinnamaldehyde ($C_{10}H_{10}O_2$), safranal ($C_{10}H_{14}O$), 8-oxogeranial ($C_{10}H_{14}O_2$), or citronellal ($C_{10}H_{18}O$); (k) $C_{11}$ aldehydes including undecanals ($C_{11}H_{22}O$), helional ($C_{11}H_{12}O_3$), nitrophenyl pentadienal ($C_{11}H_9NO_3$), or sinapaldehyde ($C_{11}H_{12}O_4$); (l) $C_{12}$ aldehydes including dodecanals ($C_{12}H_{24}O$); (m) $C_{13}$ aldehydes including tridecanals ($C_{13}H_{26}O$), bourgeonal ($C_{13}H_{18}O$), or hydroxymethylpentylcyclohexenecarboxaldehyde ($C_{13}H_{22}O_2$); (n) $C_{14}$ aldehydes including tetradecanes ($C_{14}H_{28}O$) or lilial ($C_{14}H_{20}O$); (o) $C_{15}$ aldehydes including pentadecanes ($C_{15}H_{30}O$), hexyl cinnamaldehyde ($C_{15}H_{20}O$), abscisic aldehyde ($C_{15}H_{20}O_3$), velleral ($C_{15}H_{20}O_2$), or polygodial ($C_{15}H_{22}O_2$); (p) $C_{16}$ aldehydes including hexadencanals ($C_{16}H_{32}O$) or callicarpenal ($C_{16}H_{26}O$); (q) $C_{17}$ aldehydes including hetadecanals ($C_{17}H_{34}O$), botrydial ($C_{17}H_{26}O_5$), or oleocanthal ($C_{17}H_{20}O_5$); (r) $C_{18}$ aldehydes including octadecanals ($C_{18}H_{36}O$); (s) $C_{19}$ aldehydes including nonadecanals ($C_{19}H_{38}O$); (t) $C_{20}$ aldehydes including icosanals ($C_{20}H_{40}O$) or retinal ($C_{20}H_{28}O$), (u) substituted analogous thereof, and (v) mixtures or combinations thereof.

Ketones

Suitable ketones for use in the present disclosure include, without limitation, linear, branched, saturated, unsaturated, cyclic, or aromatic ketones of the general formula R'—C(O)—R', wherein R' and R'' are independently a hydrocarbyl group having between 1 and about 40 carbon atoms ($C_1$-$C_{40}$ ketones), wherein one or more of the carbon atoms may be replaced by oxygen atoms. Exemplary ketones include, without limitation, acetone, butanones, pentanones, pentanones, hexanones, heptanones, octanones, nonanones, decanones, undecanones, dodecanones, tridecanones, tetradecanones, pentadecanones, higher alkanones, and substituted analogs thereof.

Synthetic Hydratable Polymers

Suitable synthetic hydratable polymers for use in the present invention include, without limitation, (a) polyvinyl alcohol polymers and copolymers, (b) polyacrylamide polymers and copolymers, (c) poly-2-amino-2-methyl propane sulfonic acid polymers (AMPS) and copolymers, (d) polyacrylic acid polymers and copolymers, (e) polymethacrylic acid polymers and copolymers, (f) high molecular weight homo- and/or copolymers of acrylic acid crosslinked with polyalkenyl polyethers, (g) high molecular weight hydrophobically modified, cross-linked polyacrylate polymers, (h) hydrophilic, anionic, high molecular weight, cross-linked polyacrylic acid polymers, (i) for those polymers that have hydrolyzable groups, the polymers may be hydrolyzed to any desired degree, and (j) mixtures or combinations thereof Natural Hydratable Polymers Suitable natural hydratable water soluble polymers for use in this invention include, without limitation, polysaccharides and mixtures or combinations thereof. Suitable polysaccharides include galactomannan gum and cellulose derivatives. In certain embodiments, the polysaccharides include guar gum, locust bean gum, carboxymethylguar, hydroxyethylguar, hydroxypropylguar, carboxymethylhydroxypropylguar, carboxymethylhydroxyethylguar, hydroxymethyl cellulose, carboxymethylhydroxyethyl cellulose, and hydroxyethyl cellulose and mixtures or combinations thereof.

The natural hydratable polymer useful in the present invention can be any of the hydratable polysaccharides having galactose or mannose monosaccharide components and are familiar to those in the well service industry. These polysaccharides are capable of gelling in the presence of a crosslinking agent to form a gelled based fluid. For instance, suitable hydratable polysaccharides are the galactomannan gums, guars and derivatized guars. Specific examples are guar gum and guar gum derivatives. Suitable gelling agents are guar gum, hydroxypropyl guar and carboxymethyl hydroxypropyl guar. In certain embodiment, the hydratable polymers for the present invention are guar gum and carboxymethyl hydroxypropyl guar and hydroxypropyl guar. Other exemplary fracturing fluid formulations are disclosed in U.S. Pat. Nos. 5,201,370 and 6,138,760, which are incorporated herein by reference. In other embodiments, the hydratable natural polysaccharides include, without limitation, guar gum, guar gum derivatives, locust bean gum, Karaya gum, carboxymethyl cellulose, carboxymethyl hydroxyethyl cellulose, hydroxyethyl cellulose, or mixtures and combinations thereof. In other embodiments, the hydratable natural polysaccharides include, without limitation, guar gums, hydroxypropyl guar, carboxymethyl hydroxypropyl guar, carboxymethyl guar, carboxymethyl hydroxyethyl cellulose, or mixtures and combinations thereof.

Friction Reducers

Suitable friction reducers and high viscosity friction reduces include, without limitation, polyacrylamide polymers and copolymers.

Proppants

The proppant type can be sand, intermediate strength ceramic proppants (available from Carbo Ceramics, Norton Proppants, etc.), sintered bauxites and other materials known to the industry. Any of these base propping agents can further be coated with a resin (available from Santrol, a Division of Fairmount Industries, Borden Chemical, etc.) to potentially improve the clustering ability of the proppant. In addition, the proppant can be coated with resin or a proppant flowback control agent such as fibers for instance can be simultaneously pumped. By selecting proppants having a contrast in one of such properties such as density, size and concentrations, different settling rates will be achieved. Also resin coated proppants from CARBO Ceramics Inc., Hexion, Fairmount Santrol, or other resin coated proppants.

Propping agents or proppants are typically added to the fracturing fluid prior to the addition of a crosslinking agent. However, proppants may be introduced in any manner which achieves the desired result. Any proppant may be used in embodiments of the invention. Examples of suitable proppants include, but are not limited to, quartz sand grains, glass and ceramic beads, walnut shell fragments, aluminum pellets, nylon pellets, and the like. Proppants are typically used in concentrations between about 1 to 8 lbs. per gallon of a fracturing fluid, although higher or lower concentrations may also be used as desired. The fracturing fluid may also contain other additives, such as surfactants, corrosion inhibitors, mutual solvents, stabilizers, paraffin inhibitors, tracers to monitor fluid flow back, and so on.

Besides the proppant concentrations in the final formulation, the particles sizes of the proppants are also a factor in the performance of the fluids of this invention. In certain embodiments, the proppants have sizes of 16/20 mesh, 16/30 mesh, 20/40 mesh and mixtures and combinations thereof. In addition, proppant density is another factor in the performance of the fluids of this invention. Exemplary examples of the proppants useful in this invention include, without limitation, CARBO-HSP® 16/30 mesh and 20/40 mesh having a bulk density=2 g/cm$^3$ and CARBO-LITE® 16/20 mesh and 20/40 mesh having a bulk density=1.57 g/cm$^3$, and mixtures or combinations thereof.

Aqueous Base Fluids

Suitable aqueous base fluids includes, without limitation, seawater, brackish water, produced water, flowback water, water including one or more water soluble salts such as metal chloride, metal phosphates, metal sulfates, metal, or makeup water containing up to about 30% crude oil, or mixtures thereof, wherein the metals are alkali metals, alkaline metals, transition metals or mixtures and combinations thereof Other Additives The fracturing fluids of this invention can also include other additives as well such as scale inhibitors, carbon dioxide control additives, paraffin control additives, oxygen control additives, biocides, gel stabilizers, surfactants, clay control additives, or other additives.

Scale Control

Suitable additives for Scale Control and useful in the compositions of this invention include, without limitation: chelating agents, e.g., Na$^+$, K$^+$ or NH$_4^+$ salts of EDTA; Na$^+$, K$^+$ or NH$_4^+$ salts of NTA; Na$^+$, K$^+$ or NH$_4^+$ salts of Erythorbic acid; Na$^+$, K$^+$ or NH$_4^+$ salts of thioglycolic acid (TGA); Na$^+$, K$^+$ or NH$_4^+$ salts of Hydroxy acetic acid; Na$^+$, K$^+$ or NH$_4^+$ salts of Citric acid; Na, K or NH$_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), amino phosphonates of: MEA (monoethanolamine), NH$_3$, EDA (ethylene diamine), bishydroxyethylene diamine, bisaminoethylether, DETA (diethylenetriamine), HMDA (hexamethylene diamine), hyper homologues and isomers of HMDA, Polyamines of EDA and DETA, Diglycolamine and homologues, or similar polyamines or mixtures or combinations thereof; phosphate esters, e.g., polyphosphoric acid esters or phosphorus pentoxide (P$_2$O$_5$) esters of: alkanol amines such as MEA, DEA, triethanol amine (TEA), bishydroxyethylethylene diamine; ethoxylated alcohols, glycerin, glycols such as EG (ethylene glycol), propylene glycol, butylene glycol, hexylene glycol, trimethylol propane, pentaeryithrol, neopentyl glycol or the like; tris & tetra hydroxy amines; ethoxylated alkyl phenols (limited use due to toxicity problems), and ethoxylated amines such as monoamines such as MDEA and higher amines from 2 to 24 carbons atoms, diamines 2 to 24 carbons carbon atoms, or the like.

Paraffin Control

Suitable additives for use in the fracturing fluids of this invention for paraffin removal, dispersion, and/or paraffin crystal distribution include, without limitation: cellosolves available from dow chemicals company; cellosolve acetates; ketones; acetate and formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, wherein the resulting surfactants have a range of HLBs. Suitable alkylphenols used in preparation of the surfactants include, without limitation, nonylphenol, decylphenol, dodecylphenol or other alkylphenols wherein the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Experiments of the Disclosure

Comparative Example 1

This example illustrates a control sand slurry including sand precoated with 0.5% v/w of an organo siloxane solution and slurried in the absence of an aldehyde enhancing proppant suspending agent.

Figure 1:
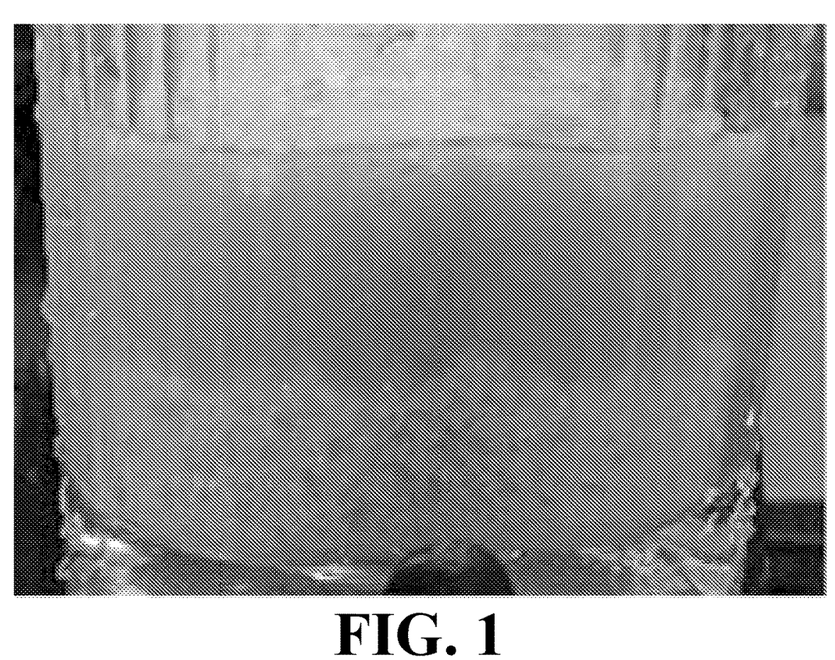
FIG. 1 depicts a photograph of a control composition including 0.5% v/w of a silicon proppant coating composition.

The control slurry was composed of sand precoated with a 0.5% v/w of a blend of organo siloxane per weight of sand (KSS-8), 0.1% v/v anionic friction reducer KGFR-1 (brine based), and 48% w/v of 40:70 mesh sand in 200 mL of 100% produced Marcellus water as a control. The control slurry was sheared in a 1 liter blender jar @ 6500 RPM for 2 minutes. The control slurry showed less than 5% suspended sand as shown in FIG. 1.

Example 1

This example illustrates a slurry including sand precoated with 0.5% v/w of an organo siloxane solution and slurried in the presence of 50 ppm of an aldehyde enhancing proppant suspending agent.

Figure 2:
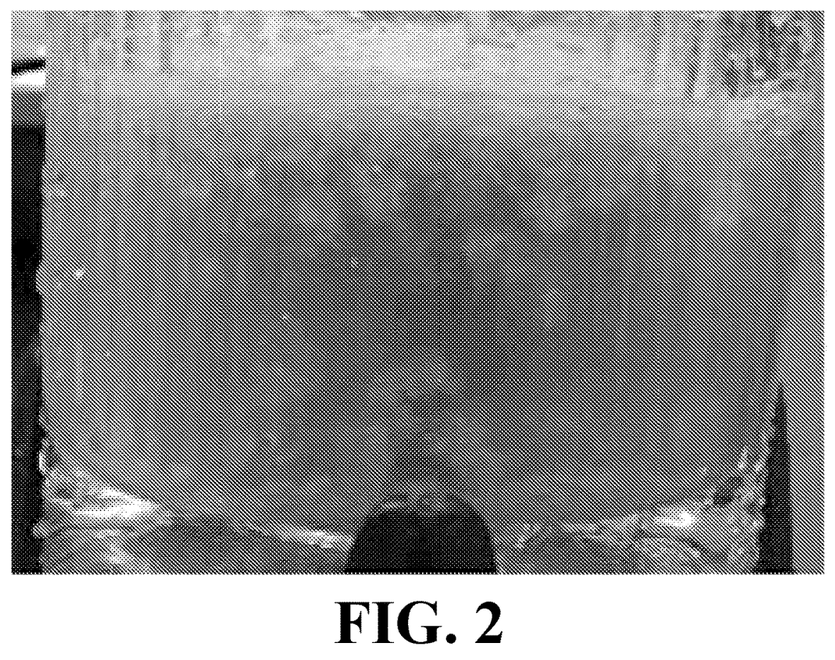
FIG. 2 depicts a photograph of a hydrophobically modified proppant suspending composition including 0.5% v/w of a silicon proppant coating composition and 50 ppm of a proppant suspending composition.

The slurry was composed of 0.1% v/v anionic friction reducer KGFR-1 (brine based), 50 ppm a glutaraldehyde enhancing suspending agent, and 48% w/v of 40:70 mesh sand precoated with 0.5% v/w of a blend of organo siloxane per weight of sand (KSS-8) in 200 mL of 100% produced Marcellus water. The slurry was sheared in a 1 liter blender jar @ 6500 RPM for 2 minutes. The slurry with the enhancing suspending agent showed greater than 50% suspended sand as shown in FIG. 2.

Comparative Example 2

This example illustrates a control sand slurry including sand precoated with 1.0% v/w of an organo siloxane solution slurred in the absence of an aldehyde enhancing proppant suspending agent.

Figure 3:
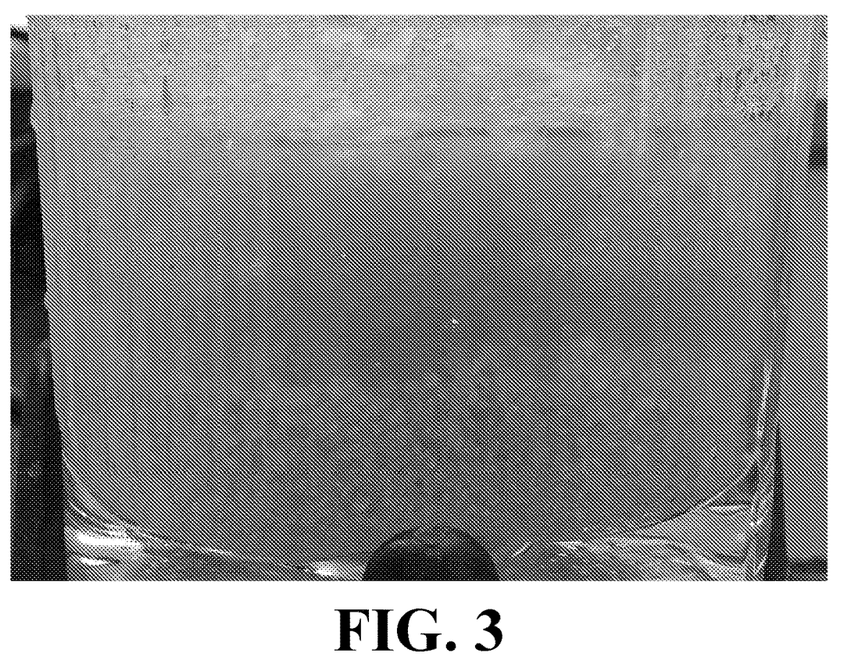
FIG. 3 depicts a photograph of a control composition including 1.0% v/w of a silicon proppant coating composition.

The control slurry was composed of 1.0% v/v of a blend of organo siloxane per weight of sand (KSS-8), 0.1% v/v anionic friction reducer KGFR-1 (brine based), and 48% w/v 40:70 mesh Sand in 200 mL in 100% produced Marcellus water. The control slurry was sheared in a 1 liter blender jar @ 6500 RPM for 2 minutes. The control slurry showed less than 5% suspended sand as shown in FIG. 3.

Example 2

This example illustrates a sand slurry including sand precoated with 1.0% v/w of an organo siloxane solution slurried in the presence of 50 ppm of an aldehyde enhancing proppant suspending agent.

Figure 4:
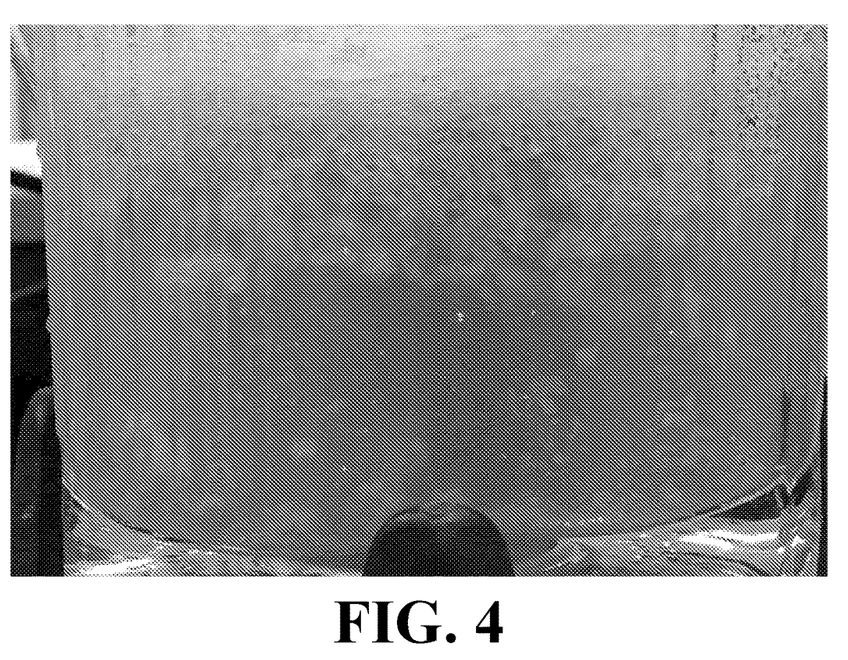
FIG. 4 depicts a photograph of a hydrophobically modified proppant suspending composition including 1.0% v/w of a silicon proppant coating composition and 50 ppm of a proppant suspending composition.

The slurry was composed of 0.1% v/v anionic friction reducer KGFR-1 (brine based), 50 ppm glutaraldehyde enhancing proppant suspending agent, and 48% w/v 40:70 mesh sand precoated with 1.0% v/w of a blend of organo siloxane per weight of sand (KSS-8) in 200 mL in 100% produced Marcellus water. The slurry was sheared in a 1 liter blender jar @ 6500 RPM for 2 minutes. The slurry with the enhancing proppant suspending agent showed greater than 85% suspended sand as shown in FIG. 4.

Example 3

This example illustrates analysis of the produced Marcellus water.

TABLE I

Water Analysis to Determine Dissolved Solids

| Anions | mg/L | meq/L | Cations | mg/L | meq/L |
|---|---|---|---|---|---|
| Chlorides | 84854.10 | 2392.89 | Sodium | 28730.00 | 1249.76 |
| Sulfate | 0.00 | 0.00 | Calcium | 14630.00 | 731.50 |
| Bicarbonates | 24.40 | 0.40 | Magnesium | 1451.00 | 119.42 |
| Carbonates | 0.00 | 0.00 | Barium | 621.70 | 9.08 |
| Hydroxide | 0.00 | 0.00 | Strontium | 2125.00 | 48.50 |
| Phosphate | 0.00 | 0.00 | Potassium | 110.90 | 2.84 |
| Silica | 0.00 | 0.00 | Iron | 103.30 | 5.55 |
| | | | Chromium | 0.00 | 0.00 |
| pH | 5.48 | | Manganese | 0.00 | 0.00 |

TABLE II

Water Analysis to Determine Hard Water Components

| Scaling Index of $CaCO_3$* | | $CaSO_4$ Concentration and Calculated Solubility** | |
|---|---|---|---|
| | SI | Concentration | 0.000 meq/L |
| 30° C. | −1.4041 | 30° C. | 16.245 meq/L |
| 50° C. | −0.9215 | 50° C. | 15.949 meq/L |
| 80° C. | 0.0949 | 80° C. | 15.729 meq/L |

Figure 5:
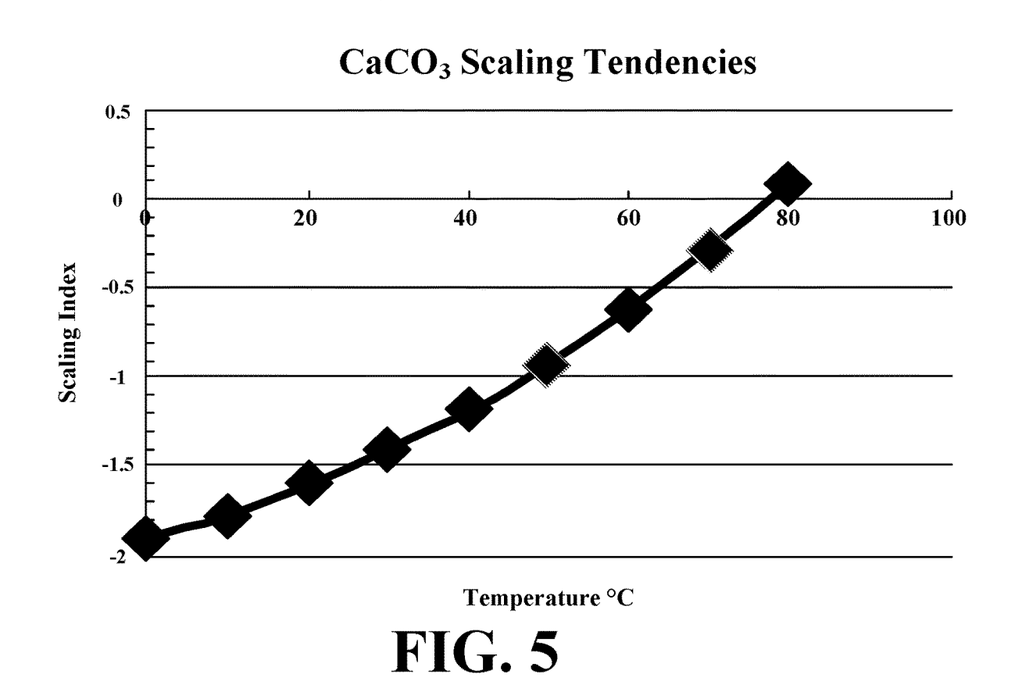
FIG. 5 depicts a plot of $CaCO_3$ scaling tendencies.
Figure 6:
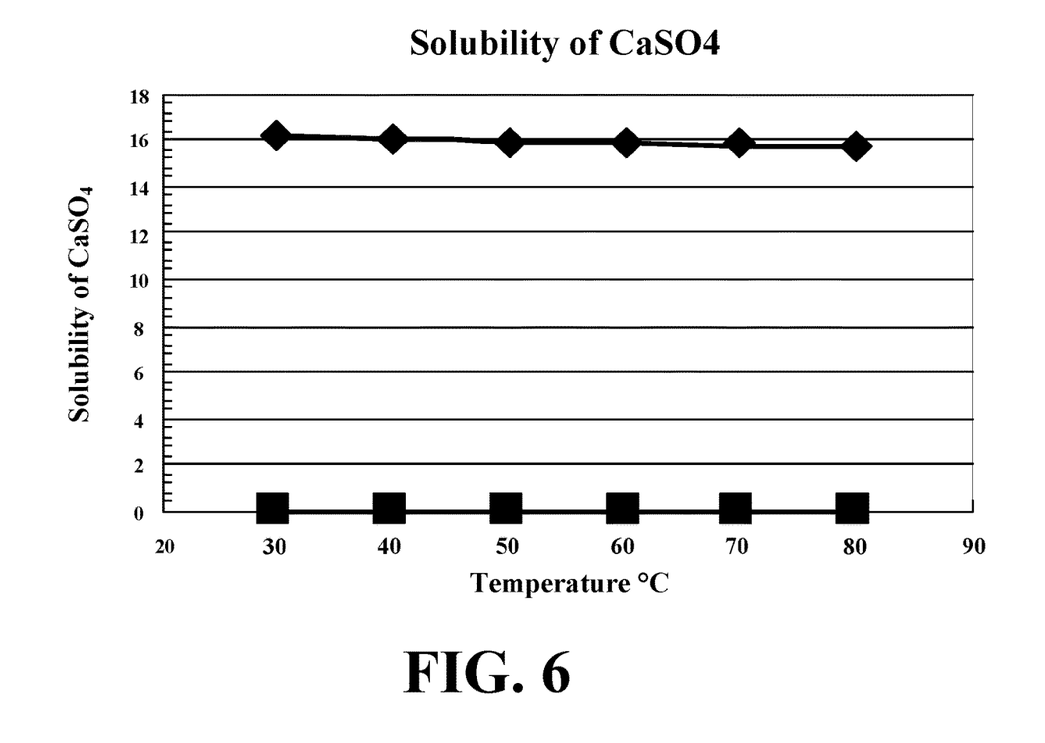
FIG. 6 depicts a plot of solubility of $CaCO_3$.

*Scaling is probable if SI is greater than 0, Severity increasing with higher SI values
**Scaling is probable if concentration is greater than calculated solubility FIG. 5 shows that result of SI testing of $CaCO_3$ scale tendency at a temperature ranging from 0° C. to 80° C. The SI scale is measured scale tendency of a solution. Solution having an SI<0 means that scale formation is unlikely, while a solution having a SI>0 means that scale formation is indicated. FIG. 6 shows that the calculated $CaSO_4$ solubility as a function of temperature.

TABLE III

Theoretical Values of Scale

| $CaCO_3$ | mg/L | $CaSO_4$ | mg/L | $BaSO_4$ | mg/L |
|---|---|---|---|---|---|
| 30° C. | 0.0 | 30° C. | 0.0 | 25° C. | 0.0 |
| 40° C. | 0.0 | 40° C. | 0.0 | 50° C. | 0.0 |

TABLE III-continued

Theoretical Values of Scale

| $CaCO_3$ | mg/L | $CaSO_4$ | mg/L | $BaSO_4$ | mg/L |
|---|---|---|---|---|---|
| 50° C. | 0.0 | 50° C. | 0.0 | 65° C. | 0.0 |
| 60° C. | 0.0 | 60° C. | 0.0 | 80° C. | 0.0 |
| 70° C. | 0.0 | 70° C. | 0.0 | 95° C. | 0.0 |
| 80° C. | 8.6 | 80° C. | 0.0 | | |

The produced water had a specific gravity (SG) was 1.111 and have a boron content of 219.1 mg/L.

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

We claim:

1. A proppant suspending composition comprising:
   an aldehyde, a mixture of aldehydes, a ketone, a mixture of ketones, or mixtures or combinations thereof,
   wherein the composition is adapted to be present in an effective amount between about 1 ppm and 1,000 ppm in an aqueous based fracturing fluid,
   wherein the aqueous base fluid include at least 5,000 ppm total dissolved solids,
   wherein the composition does not include an ammonium based quaternary salt, and
   wherein the composition is adapted to suspend hydrophobically modified proppants in the fracturing fluid.

2. The composition of claim 1, wherein:
   the aldehydes are compounds of the formula:

R—CHO

R is a hydrocarbyl group having between 1 and about 40 carbon atoms ($C_1$-$C_{40}$ aldehydes), and one or more of the carbon atoms may be replaced by oxygen atoms, and
   the ketones are compounds of the formula:

R'—C(O)—R''

R' and R'' are independently a hydrocarbyl group having between 1 and about 40 carbon atoms ($C_1$-$C_{40}$ ketones), one or more of the carbon atoms may be replaced by oxygen atoms.

3. The composition of claim 2, wherein:
   the aldehydes are selected from the group consisting of formaldehydes, ethanal, propanals, butanals, pentanals, hexanals, heptanals, octanals, nonanals, decanals, undecanals, dodecanals, tridecanals, tetradecanals, pentadecanals, higher alkanals, substituted analogs thereof, and mixtures or combinations thereof, and
   the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof.

4. The composition of claim 2, wherein:
   the aldehydes are selected from the group consisting of:
   (a) $C_1$ aldehydes including formaldehyde ($CH_2O$);
   (b) $C_2$ aldehydes including glyoxylic acid ($C_2H_2O_3$), chloroacetaldehyde ($C_2H_3ClO$), glyoxal ($C_2H_2O_2$), glycolaldehyde (C$_2$H$_4$O$_2$), fluoroacetaldehyde (C$_2$H$_3$FO), chloral (C$_2$HCl$_3$O), or acetaldehyde (C$_2$H$_4$O);
(c) C$_3$ aldehydes including propionaldehydes or propanals (C$_3$H$_6$O), glyceraldehyde (C$_3$H$_6$O$_3$), malondialdehyde (C$_3$H$_4$O$_2$), lactaldehyde (C$_3$H$_6$O$_2$), or methylglyoxal (C$_3$H$_4$O$_2$);
(d) C$_4$ aldehydes including butyraldehydes or butanals (C$_4$H$_8$O), succinaldehyde (C$_4$H$_6$O$_2$), 3-hydroxybutanal (C$_4$H$_8$O$_2$), isobutyraldehyde (C$_4$H$_8$O), or g-hydroxybutyraldehyde (C$_4$H$_8$O$_2$);
(e) C$_5$ aldehydes including pentanals (C$_5$H$_{10}$O), trans-2-methyl-2-butenal (C$_5$H$_8$O), furfural (C$_5$H$_4$O$_2$), glutaconaldehyde (C$_5$H$_6$O$_2$), glutaraldehyde (C$_5$H$_8$O$_2$), isovaleraldehyde (C$_5$H$_{10}$O), or pivaldehyde (C$_5$H$_{10}$O);
(f) C$_6$ aldehydes including hexanals (C$_6$H$_{12}$O), hydroxymethylfurfural (C$_6$H$_6$O$_3$), or cis-3-hexenal (C$_6$H$_{10}$O); (g) C$_7$ aldehydes including heptanals (C$_7$H$_{14}$O), phenolic aldehyde (C$_7$H$_6$O$_2$), methoxymethylfurfural (C$_7$H$_8$O$_3$), tetrahydrobenzaldehyde (C$_7$H$_{10}$O), or benzaldehyde (C$_7$H$_6$O);
(h) C$_8$ aldehydes including octanals (C$_8$H$_{16}$O), phenylglyoxal (C$_8$H$_6$O$_2$), 3,4-dihydroxyphenylacetaldehyde (C$_8$H$_8$O$_3$), or phenylacetaldehyde (C$_8$H$_8$O);
(i) C$_9$ aldehydes including nonanals (C$_9$H$_{18}$O), 2-nitrocinnamaldehyde (C$_9$H$_7$O$_3$N), 4-oxo-2-nonenal (C$_9$H$_{14}$O$_2$), cinnamaldehyde (C$_9$H$_8$O), or 4-hydroxynonenal (C$_9$H$_{16}$O$_2$);
(j) C$_{10}$ aldehydes including decanals (C$_{10}$H$_{20}$O), citral (C$_{10}$H$_{16}$O), hydroxycitronellal (C$_{10}$H$_{20}$O$_2$), 4-methoxycinnamaldehyde (C$_{10}$H$_{10}$O$_2$), safranal (C$_{10}$H$_{14}$O), 8-oxogeranial (C$_{10}$H$_{14}$O$_2$), or citronellal (C$_{10}$H$_{18}$O);
(k) C$_{11}$ aldehydes including undecanals (C$_{11}$H$_{22}$O), helional (C$_{11}$H$_{12}$O$_3$), nitrophenyl pentadienal (C$_{11}$H$_9$NO$_3$), or sinapaldehyde (C$_{11}$H$_{12}$O$_4$);
(l) C$_{12}$ aldehydes including dodecanals (C$_{12}$H$_{24}$O);
(m) C$_{13}$ aldehydes including tridecanals (C$_{13}$H$_{26}$O), bourgeonal (C$_{13}$H$_{18}$O), or hydroxymethylpentylcyclohexenecarboxaldehyde (C$_{13}$H$_{22}$O$_2$);
(n) C$_{14}$ aldehydes including tetradecanes (C$_{14}$H$_{28}$O) or lilial (C$_{14}$H$_{20}$O);
(o) C$_{15}$ aldehydes including pentadecanes (C$_{15}$H$_{30}$O), hexyl cinnamaldehyde (C$_{15}$H$_{20}$O), abscisic aldehyde (C$_{15}$H$_{20}$O$_3$), velleral (C$_{15}$H$_{20}$O$_2$), or polygodial (C$_{15}$H$_{22}$O$_2$)
(p) C$_{16}$ aldehydes including hexadencanals (C$_{16}$H$_{32}$O) or callicarpenal (C$_{16}$H$_{26}$O);
(q) C$_{17}$ aldehydes including hetadecanals (C$_{17}$H$_{34}$O), botrydial (C$_{17}$H$_{26}$O$_5$), or oleocanthal (C$_{17}$H$_{20}$O$_5$);
(r) C$_{18}$ aldehydes including octadecanals (C$_{18}$H$_{36}$O);
(s) C$_{19}$ aldehydes including nonadecanals (C$_{19}$H$_{38}$O);
(t) C$_{20}$ aldehydes including icosanals (C$_{20}$H$_{40}$O) or retinal (C$_{20}$H$_{28}$O), substituted analogous thereof, and mixtures or combinations thereof;
(u) substituted analogous thereof, and
(v) mixtures or combinations thereof,
the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof.

5. The composition of claim 1, further comprising:
a quaternary salt comprises compounds of the general formula:

R$^1$, R$^2$, and R$^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom,
Ar is an aryl group, alkaaryl groups, aralkyl groups, and mixtures thereof having between 5 and 40 carbon atoms, wherein one or more of the carbon atoms may be replaced with an oxygen atom, a nitrogen atom, a sulfur atoms, or mixtures thereof, and
X is a counterion.

6. The composition of claim 1, wherein the hydrophobically modified proppants comprising a coating having a water contact angle greater than about 90 degrees.

7. A fracturing fluid composition comprising:
an aqueous base fluid having a total dissolved solids greater than or equal to about 5,000 ppm,
a friction reducer, a mixture of friction reducers, a high viscosity friction reducer, a mixture of high viscosity friction reducers, a viscosifying agent, or mixture of viscosifying agents, an effective amount of a proppant suspending composition including;
an aldehyde,
a mixture of aldehydes,
a ketone,
a mixture of ketones, or
mixtures or combinations thereof,
wherein the effective amount is between about 1 ppm and 1,000 ppm,
wherein the proppant suspending composition does not include an ammonium based quaternary salt, and
one or more hydrophobically modified proppants,
wherein the effective amount is sufficient to suspend the hydrophobically modified proppants in the fracturing fluid.

8. The composition of claim 7, wherein:
the aqueous base fluid comprises a brackish water, a produced water, a flow back water, a reclaimed water, or mixtures and combinations thereof.

9. The composition of claim 7, further comprising:
a crosslinking agent or a mixture of crosslinking agents including borates, borates related crosslinkers, zirconates, zirconate derivatives, aluminates, aluminate derivatives, or mixtures thereof, or
a crosslinking agent or a mixture of crosslinking agents including borates, borates related crosslinkers, zirconates, zirconate derivatives, aluminates, aluminate derivatives, or mixtures thereof, and
a crosslinking delay agent or a mixture of crosslinking delay agents.

10. The composition of claim 7, wherein:
the one or more proppants are precoated or coated in a slurry with a hydrophobic proppant treating composition to form hydrophobically modified proppants, and
the hydrophobic proppant treating composition comprising an organosilane, a fluoro-organosiloxane, a fluoro-organosilane, a siloxane, or mixtures and combinations thereof.

11. The composition of claim 7, wherein:
the aldehydes are compounds of the formula:

$$R\text{—}CHO$$

R is a hydrocarbyl group having between 1 and about 40 carbon atoms ($C_1$-$C_{40}$ aldehydes), and one or more of the carbon atoms may be replaced by oxygen atoms, and the ketones are compounds of the formula:

$$R'\text{—}C(O)\text{—}R''$$

R' and R'' are independently a hydrocarbyl group having between 1 and about 40 carbon atoms ($C_1$-$C_{40}$ ketones), one or more of the carbon atoms may be replaced by oxygen atoms.

12. The composition of claim 11, wherein:
the aldehydes are selected from the group consisting of formaldehyde, ethanal, propanals, butanals, pentanals, hexanals, heptanals, octanals, nonanals, decanals, undecanals, dodecanals, tridecanals, tetradecanals, pentadecanals, higher alkanals, substituted analogs thereof, and mixtures or combinations thereof, and
the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof.

13. The composition of claim 12, wherein:
the aldehydes are selected from the group consisting of:
the aldehydes are selected from the group consisting of:
(a) $C_1$ aldehydes including formaldehyde ($CH_2O$);
(b) $C_2$ aldehydes including glyoxylic acid ($C_2H_2O_3$), chloroacetaldehyde ($C_2H_3ClO$), glyoxal ($C_2H_2O_2$), glycolaldehyde ($C_2H_4O_2$), fluoroacetaldehyde ($C_2H_3FO$), chloral ($C_2HCl_3O$), or acetaldehyde ($C_2H_4O$);
(c) $C_3$ aldehydes including propionaldehydes or propanals ($C_3H_6O$), glyceraldehyde ($C_3H_6O_3$), malondialdehyde ($C_3H_4O_2$), lactaldehyde ($C_3H_6O_2$), or methylglyoxal ($C_3H_4O_2$);
(d) $C_4$ aldehydes including butyraldehydes or butanals ($C_4H_8O$), succinaldehyde ($C_4H_6O_2$), 3-hydroxybutanal ($C_4H_8O_2$), isobutyraldehyde ($C_4H_8O$), or g-hydroxybutyraldehyde ($C_4H_8O_2$);
(e) $C_5$ aldehydes including pentanals ($C_5H_{10}O$), trans-2-methyl-2-butenal ($C_5H_8O$), furfural ($C_5H_4O_2$), glutaconaldehyde ($C_5H_6O_2$), glutaraldehyde ($C_5H_8O_2$), isovaleraldehyde ($C_5H_{10}O$), or pivaldehyde ($C_5H_{10}O$);
(f) $C_6$ aldehydes including hexanals ($C_6H_{12}O$), hydroxymethylfurfural ($C_6H_6O_3$), or cis-3-hexenal ($C_6H_{10}O$); (g) $C_7$ aldehydes including heptanals ($C_7H_{14}O$), phenolic aldehyde ($C_7H_6O_2$), methoxymethylfurfural ($C_7H_8O_3$), tetrahydrobenzaldehyde ($C_7H_{10}O$), or benzaldehyde ($C_7H_6O$);
(h) $C_8$ aldehydes including octanals ($C_8H_{16}O$), phenylglyoxal ($C_8H_6O_2$), 3,4-dihydroxyphenylacetaldehyde ($C_8H_8O_3$), or phenylacetaldehyde ($C_8H_8O$);
(i) $C_9$ aldehydes including nonanals ($C_9H_{18}O$), 2-nitrocinnamaldehyde ($C_9H_7O_3N$), 4-oxo-2-nonenal ($C_9H_{14}O_2$), cinnamaldehyde ($C_9H_8O$), or 4-hydroxynonenal ($C_9H_{16}O_2$);
(j) $C_{10}$ aldehydes including decanals ($C_{10}H_{20}O$), citral ($C_{10}H_{16}O$), hydroxycitronellal ($C_{10}H_{20}O_2$), 4-methoxycinnamaldehyde ($C_{10}H_{10}O_2$), safranal ($C_{10}H_{14}O$), 8-oxogeranial ($C_{10}H_{14}O_2$), or citronellal ($C_{10}H_{18}O$);
(k) $C_{11}$ aldehydes including undecanals ($C_{11}H_{22}O$), helional ($C_{11}H_{12}O_3$), nitrophenyl pentadienal ($C_{11}H_9NO_3$), or sinapaldehyde ($C_{11}H_{12}O_4$);
(l) $C_{12}$ aldehydes including dodecanals ($C_{12}H_{24}O$);
(m) $C_{13}$ aldehydes including tridecanals ($C_{13}H_{26}O$), bourgeonal ($C_{13}H_{18}O$), or hydroxymethylpentylcyclohexenecarboxaldehyde ($C_{13}H_{22}O_2$);
(n) $C_{14}$ aldehydes including tetradecanes ($C_{14}H_{28}O$) or lilial ($C_{14}H_{20}O$);
(o) $C_{15}$ aldehydes including pentadecanes ($C_{15}H_{30}O$), hexyl cinnamaldehyde ($C_{15}H_{20}O$), abscisic aldehyde ($C_{15}H_{20}O_3$), velleral ($C_{15}H_{20}O_2$), or polygodial ($C_{15}H_{22}O_2$);
(p) $C_{16}$ aldehydes including hexadencanals ($C_{16}H_{32}O$) or callicarpenal ($C_{16}H_{26}O$);
(q) $C_{17}$ aldehydes including hetadecanals ($C_{17}H_{34}O$), botrydial ($C_{17}H_{26}O_5$), or oleocanthal ($C_{17}H_{20}O_5$);
(r) $C_{18}$ aldehydes including octadecanals ($C_{18}H_{36}O$);
(s) $C_{19}$ aldehydes including nonadecanals ($C_{19}H_{38}O$);
(t) $C_{20}$ aldehydes including icosanals ($C_{20}H_{40}O$) or retinal ($C_{20}H_{28}O$), substituted analogous thereof, and mixtures or combinations thereof,
(u) substituted analogous thereof, and
(v) mixtures or combinations thereof,
the ketones are selected from the group consisting of acetone, butanones, pentanones, pentanones, hexanones, heptanones, octanones, nonanones, decanones, undecanones, dodecanones, tridecanones, tetradecanones, pentadecanones, higher alkanones, substituted analogs thereof, and mixtures or combinations thereof.

14. The composition of claim 7, further comprising:
a quaternary salt comprises compounds of the general formula:

$$R^1R^2R^3ArN^+X^-$$

$R^1$, $R^2$, and $R^3$ are the same or different and are hydrogen atoms or substitutes selected from the group consisting of carbyl groups, hydrocarbyl groups, alkyl groups, aryl groups, alkaaryl groups, aralkyl groups, and mixtures thereof having between 1 and 40 carbon atoms, wherein one or more of the carbon atoms may be replace by an oxygen atom,
Ar is an aryl group, alkaaryl groups, aralkyl groups, and mixtures thereof having between 5 and 40 carbon atoms, wherein one or more of the carbon atoms may be replaced with an oxygen atom, a nitrogen atom, a sulfur atoms, or mixtures thereof, and $X^-$ is a counterion.

15. The composition of claim 7, wherein the hydrophobically modified proppants comprising a coating having a water contact angle greater than about 90 degrees.

* * * * *